(12) United States Patent
Araki et al.

(10) Patent No.: US 12,374,952 B2
(45) Date of Patent: Jul. 29, 2025

(54) INSULATOR, STATOR, AND ROTATING ELECTRIC MACHINE

(71) Applicant: Toshiba Industrial Products and Systems Corporation, Kawasaki (JP)

(72) Inventors: Takashi Araki, Mie-gun (JP); Motoyasu Mochizuki, Mie-gun (JP); Masaaki Matsumoto, Mie-gun (JP)

(73) Assignee: Toshiba Industrial Products and Systems Corporation, Kawasaki (JP)

( * ) Notice: Subject to any disclaimer, the term of this patent is extended or adjusted under 35 U.S.C. 154(b) by 210 days.

(21) Appl. No.: 18/041,031

(22) PCT Filed: Apr. 28, 2021

(86) PCT No.: PCT/JP2021/016960
§ 371 (c)(1),
(2) Date: Feb. 8, 2023

(87) PCT Pub. No.: WO2022/054333
PCT Pub. Date: Mar. 17, 2022

(65) Prior Publication Data
US 2023/0327509 A1    Oct. 12, 2023

(30) Foreign Application Priority Data

Sep. 9, 2020   (JP) .................................. 2020-151301

(51) Int. Cl.
*H02K 3/52*   (2006.01)

(52) U.S. Cl.
CPC ......... *H02K 3/522* (2013.01); *H02K 2203/12* (2013.01)

(58) Field of Classification Search
CPC ........................... H02K 3/522; H02K 2203/12
(Continued)

(56) References Cited

U.S. PATENT DOCUMENTS 6,127,753 A    10/2000  Yamazaki et al.
8,847,457 B2    9/2014  Yoshida et al.
(Continued)

FOREIGN PATENT DOCUMENTS

CN    204205748 U    3/2015
JP    10-271718 A   10/1998
(Continued)

OTHER PUBLICATIONS

Translation of JP2015095944A (Year: 2015).*
(Continued)

*Primary Examiner* — Terrance L Kenerly
*Assistant Examiner* — Theodore L Perkins
(74) *Attorney, Agent, or Firm* — Oblon, McClelland, Maier & Neustadt, L.L.P.

(57) ABSTRACT

An insulator includes a teeth cover portion and a crossover-wire guide portion. The crossover-wire guide portion guides a crossover-wire portion of a coil and an introduction crossover-wire portion of an introduction coil into a terminal connection portion. The crossover-wire guide portion has a guide groove that guides the crossover-wire portion and the introduction crossover-wire portion substantially in a core circumferential direction that is a circumferential direction of the stator core. In a state in which the plurality of the split cores are assembled in a ring shape, the guide groove is formed in a shape that does not coincide with a circular arc of a circle having a center corresponding to a ring center of the assembled split cores.

6 Claims, 21 Drawing Sheets

(58) Field of Classification Search
USPC .................................................. 310/216.105
See application file for complete search history.

(56) References Cited

U.S. PATENT DOCUMENTS

| | | |
|---|---|---|
| 2004/0263015 A1 | 12/2004 | Okada et al. |
| 2006/0119207 A1 | 6/2006 | Okada et al. |
| 2007/0197106 A1 | 8/2007 | Kato et al. |
| 2012/0267979 A1 | 10/2012 | Yoshida et al. |
| 2014/0354094 A1* | 12/2014 | Yazaki ............... H02K 3/28 310/71 |
| 2016/0072351 A1* | 3/2016 | Mizoue ............. H02K 3/522 310/71 |
| 2017/0201135 A1* | 7/2017 | Kai ..................... H02K 3/18 |
| 2019/0260255 A1* | 8/2019 | Kuwahara ......... H02K 3/325 |
| 2020/0014271 A1 | 1/2020 | Ogawa et al. |

FOREIGN PATENT DOCUMENTS

| | | |
|---|---|---|
| JP | 2002-281708 A | 9/2002 |
| JP | 2008-312277 A | 12/2008 |
| JP | 5666976 B2 | 2/2015 |
| JP | 2015-95944 A | 5/2015 |
| JP | 2015095944 A * | 5/2015 |
| JP | 2015-109719 A | 6/2015 |
| JP | 2015-133808 A | 7/2015 |
| JP | 2020-124004 A | 8/2020 |
| KR | 10-2018-0103324 A | 9/2018 |

OTHER PUBLICATIONS

Japanese Office Action issued on Mar. 12, 2024 in Japanese Patent Application No. 2022-547392 (with English translation), 6 pages.
Extended European Search Report Issued Aug. 7, 2024 in European Application 21866294.8, 10 pages.
International Search Report issued Jul. 20, 2021 in PCT/JP2021/016960, filed on Apr. 28, 2021, 4 pages (with English Translation).

* cited by examiner

INSULATOR, STATOR, AND ROTATING ELECTRIC MACHINE

CROSS-REFERENCE TO RELATED APPLICATION

This is the U.S. National Phase Application under 35 U.S.C. § 371 of International Patent Application No. PCT/JP2021/016960 filed Apr. 28, 2021, which designated the United States and was published in a language other than English, which claims the benefit of Japanese Patent Application No. 2020-151301 filed Sep. 9, 2020, both of them are incorporated by reference herein. The International Application was published in Japanese on Mar. 17, 2022, as WO 2022/054333 A1 under PCT Article 21 (2).

TECHNICAL FIELD

Embodiments of the present invention relate to an insulator, a stator, and a rotating electric machine.

BACKGROUND ART

A rotating electric machine including a stator and a rotor is known. For example, the stator includes a circular-ring-shaped stator core, teeth protruding from an inner peripheral surface of the stator core in a radially inward direction, a coil wound around the teeth, and an insulator attached to the teeth and used to ensure insulation between the teeth and the coil.

For example, the rotor includes a substantially column-shaped rotor core rotatably disposed in the inner side of the stator in the radial direction and a magnet provided on the rotor core.

With such a configuration, when an electrical current is supplied to the coil, an interlinkage magnetic flux is generated at each of the teeth. A magnetic suction force or a magnetic repulsion force is generated between the interlinkage magnetic flux and the magnet of the rotor, and the rotor rotates. Furthermore, when the rotor rotates due to an external force or the like, a magnetic suction force or a magnetic repulsion force is generated between a magnet of the rotor and the coil of the stator, an interlinkage magnetic flux is generated as a result, and electric power is generated between terminals.

Furthermore, as this kind of rotating electric machine, a rotating electric machine is known in which a stator core is configured of a plurality of split cores for ease of operation of winding the coil and to increase a space factor of a coil.

The split core used in the rotating electric machine includes: a substantially circular-arc-shaped back yoke portion forming a circular-ring-shaped part of the stator core; and teeth protruding from the back yoke portion in a radially inward direction. An insulator formed of an insulation material is attached to the split core. The insulator includes a teeth cover portion and a crossover-wire guide portion. The teeth cover portion is attached to the teeth. The coil is wound around the periphery of the teeth cover portion. The crossover-wire guide portion guides the coil drawn out from the teeth cover portion and the coil drawn out from the other split core into a terminal connection portion. The crossover-wire guide portion is formed in a substantially circular-arc shape on the outer side of the core in the radial direction. The crossover-wire guide portion is formed integrally with the teeth cover portion. A plurality of guide grooves (a plurality of steps) are formed in the crossover-wire guide portion. Each of the plurality of the guide grooves guides a cross-over-wire portion of the coil drawn out from the teeth cover portion and a crossover-wire portion of the coil drawn out from the other split core in a circumferential direction of the stator core. The plurality of the guide grooves are separated for each phase (for example, U-phase, V-phase, and W-phase) in the radial direction of the core.

CITATION LIST

Patent Literature

[Patent Literature 1] Japanese Patent No. 5666976

SUMMARY OF THE INVENTION

Problems to be Solved by the Invention

However, in the aforementioned conventional rotating electric machine, a guide groove formed in the crossover-wire guide portion of each insulator is formed in a uniform circular-arc shape having a constant radius from a ring center of the stator core. Consequently, when assembling the plurality of the split cores while drawing the crossover-wire portion of the coil around the guide groove of the crossover-wire guide portion for assembling a stator, the crossover-wire portion of the coil is likely to drop off from the guide groove. Therefore, it is necessary to carry out a complicated operation such as collection of the coil by using a binding yarn or the like in order to prevent the crossover-wire portion of the coil from dropping off.

The invention that solves the problem provides an insulator, a stator, and a rotating electric machine which can suppress dropping-off of a crossover-wire portion from a crossover-wire guide portion when assembling a stator.

Means for Solving the Problems

An insulator according to an embodiment includes a teeth cover portion and a crossover-wire guide portion. The crossover-wire guide portion guides: a crossover-wire portion of a coil drawn out from the teeth cover portion; and an introduction crossover-wire portion of an introduction coil that is drawn out from a second split core different from a first split core attached to the teeth cover portion and is introduced into the crossover-wire guide portion, into a terminal connection portion disposed on a circumference substantially along a ring shape of the stator core. The crossover-wire guide portion has a guide groove that guides the crossover-wire portion and the introduction crossover-wire portion substantially in a core circumferential direction that is a circumferential direction of the stator core. In a state in which the plurality of the split cores are assembled in a ring shape, the guide groove is formed in a shape that does not coincide with a circular arc of a circle having a center corresponding to a ring center of the assembled split cores.

EMBODIMENTS FOR CARRYING OUT THE INVENTION

Figure 1:
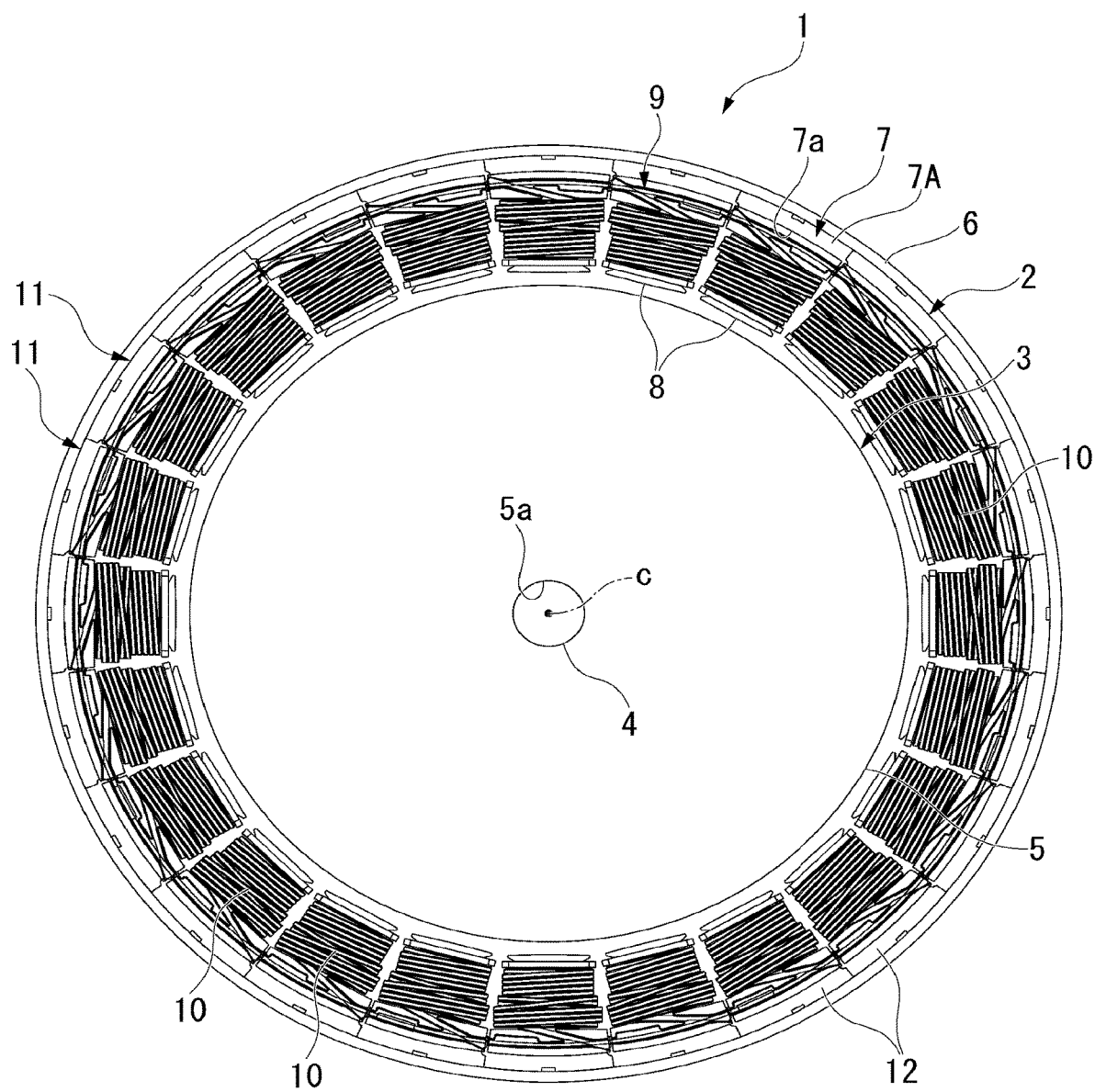
FIG. 1 is a plan view showing a rotating electric machine according to an embodiment when viewed from one side of an axial direction.

Hereinafter, an insulator, a stator, and a rotating electric machine according to an embodiment will be described with reference to the drawings.

In the drawings, reference numeral Ax represents an axial direction. Reference numeral C represents a circumferential direction. Reference numeral R represents a radial direction.

Figure 2:
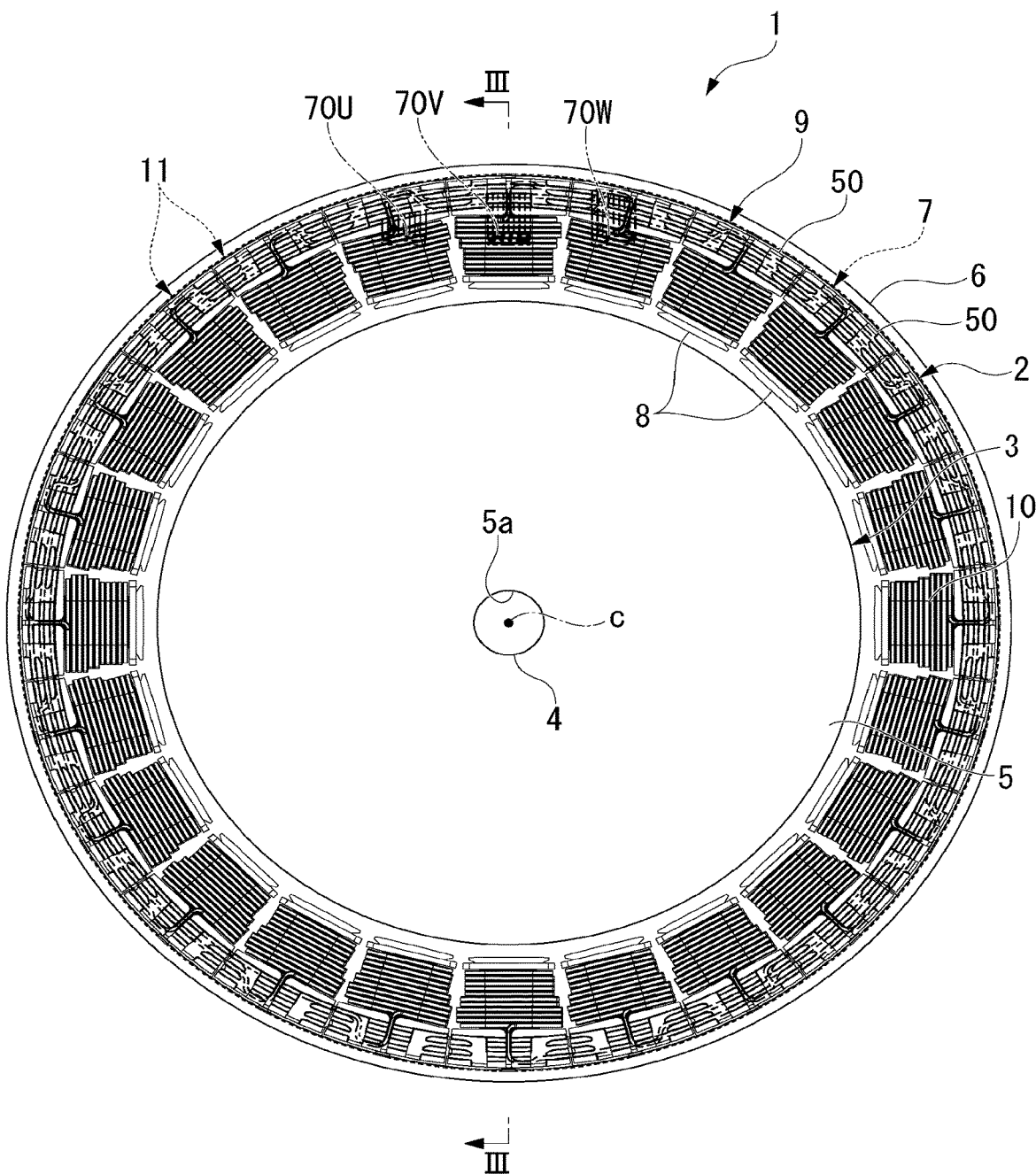
FIG. 2 is a plan view showing a rotating electric machine according to an embodiment when viewed from the other side of the axial direction.
Figure 3:
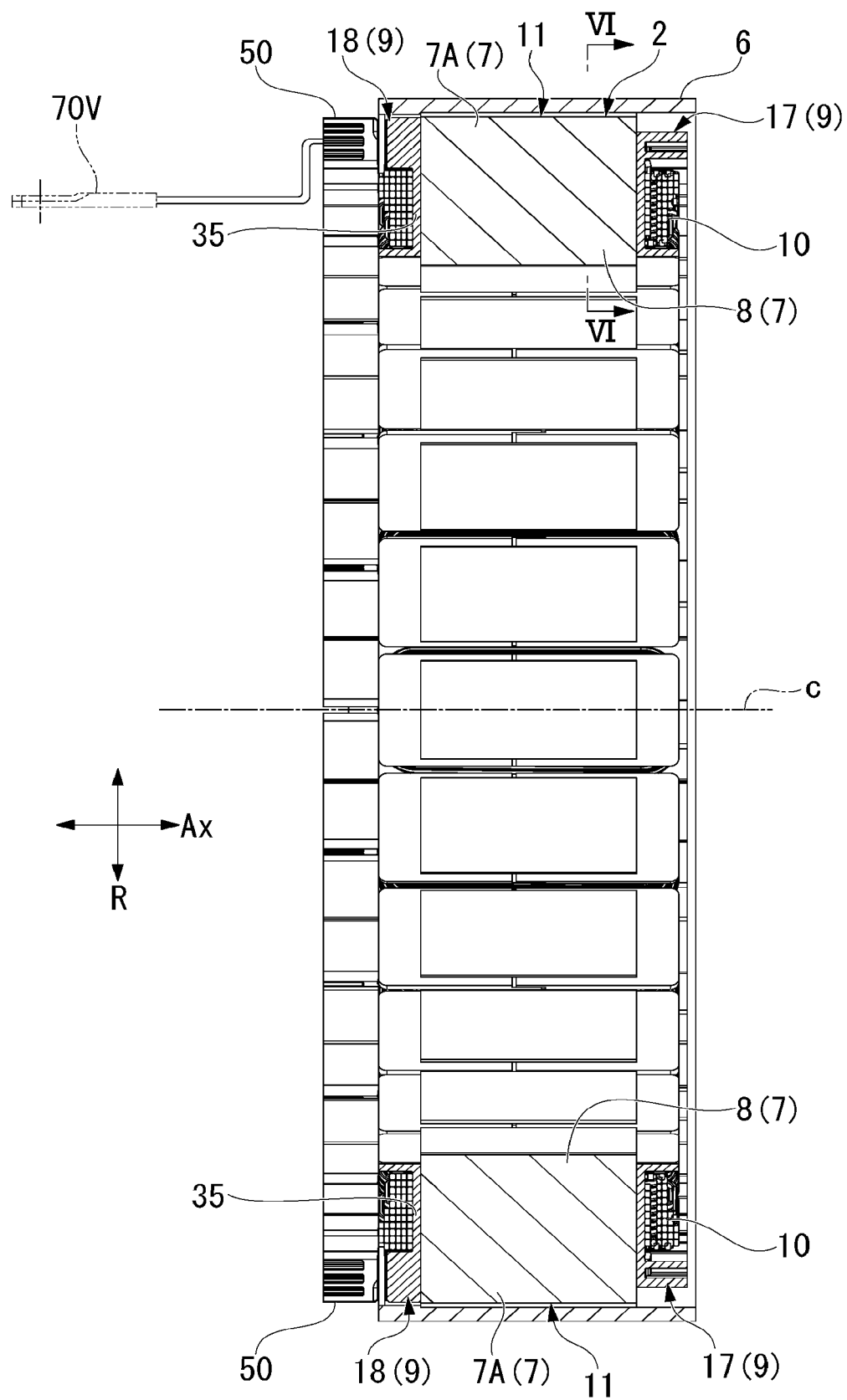
FIG. 3 is a view showing a state in which a rotor is removed from the rotating electric machine according to the embodiment and is a cross-sectional view taken along line III-III of FIG. 2.

FIG. 1 is a plan view showing a rotating electric machine 1 when viewed from one side of the axial direction. FIG. 2 is a plan view showing the rotating electric machine 1 when viewed from the other side of the axial direction. Additionally, FIG. 3 is a view showing a state in which a rotor 3 is removed from the rotating electric machine 1 and is a cross-sectional view taken along line III-III of FIG. 2 showing the rotating electric machine 1.

The rotating electric machine 1 includes: a substantially cylindrical stator 2; and the rotor 3 that is disposed in the inner side of the stator 2 in the radial direction and is rotatably provided with respect to the stator 2.

In the following description, a direction parallel to a rotation axis c of the rotor 3 is referred to as an axial direction, a rotation direction of the rotor 3 is referred to as a circumferential direction, and a radial direction of the rotor 3 orthogonal to the axial direction and the circumferential direction is simply referred to as a radial direction.

Note that, a core axial direction that is an axial direction of a stator core 7 described below coincides with a direction in which the rotation axis c of the rotor 3 extends. A core circumferential direction that is the circumferential direction of the stator core 7 coincides with a rotation direction of the rotor 3. A core radial direction that is a radial direction of the stator core 7 coincides with a radial direction of the rotor 3.

The rotor 3 includes: a shaft 4 that rotates around the rotation axis c; and a rotor core 5 that is fixed to the shaft 4. A through-hole 5a that penetrates through the rotor core 5 in the axial direction is formed at a center in the radial direction of the rotor core 5. The shaft 4 is fixed to the through-hole 5a by, for example, press-fitting. A plurality of magnets, which are not shown in the drawings, are arranged in the circumferential direction and are attached to positions near the outer-periphery portion of the rotor core 5.

The stator 2 is fixed to and fitted into an inner peripheral surface of a cylindrical stator casing 6. The axial directions of the stator casing 6 and the stator 2 coincide with the rotation axis c. The stator 2 includes the stator core 7, the stator core 7 having insulation property, and a coil 10. The stator core 7 includes a cylindrical core body part 7A (refer to FIG. 1) and a plurality of teeth 8 (for example, 24 in the embodiment) provided to protrude from an inner peripheral surface 7a of the core body part 7A. An insulator 9 is attached to the stator core 7 so as to cover the periphery of each of the teeth 8. The coil 10 is wound around the insulator 9 attached to the teeth 8 by a concentrated winding method.

Here, a split-core configuration separable in the circumferential direction is employed for the stator core 7. That is, the stator core 7 is configured of a plurality of split cores 11. The split core 11 is a member separated for each of the teeth 8 in the circumferential direction. The plurality of the split cores 11 are coupled in a ring form and therefore form the stator core 7. In the embodiment, the number of the split cores 11 is twenty-four.

Figure 4:
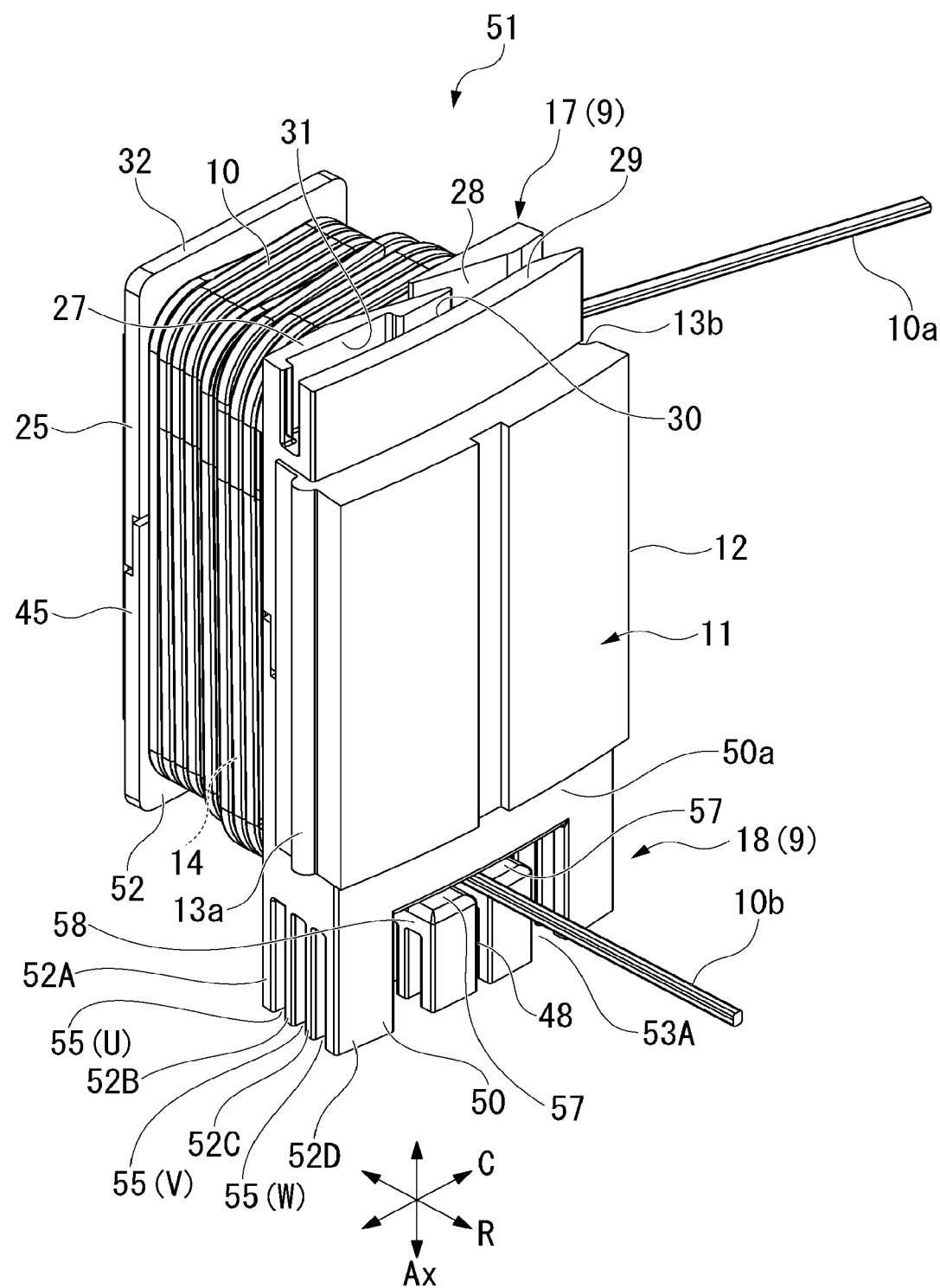
FIG. 4 is a perspective view showing a winding block according to the embodiment when viewed from one direction.
Figure 5:
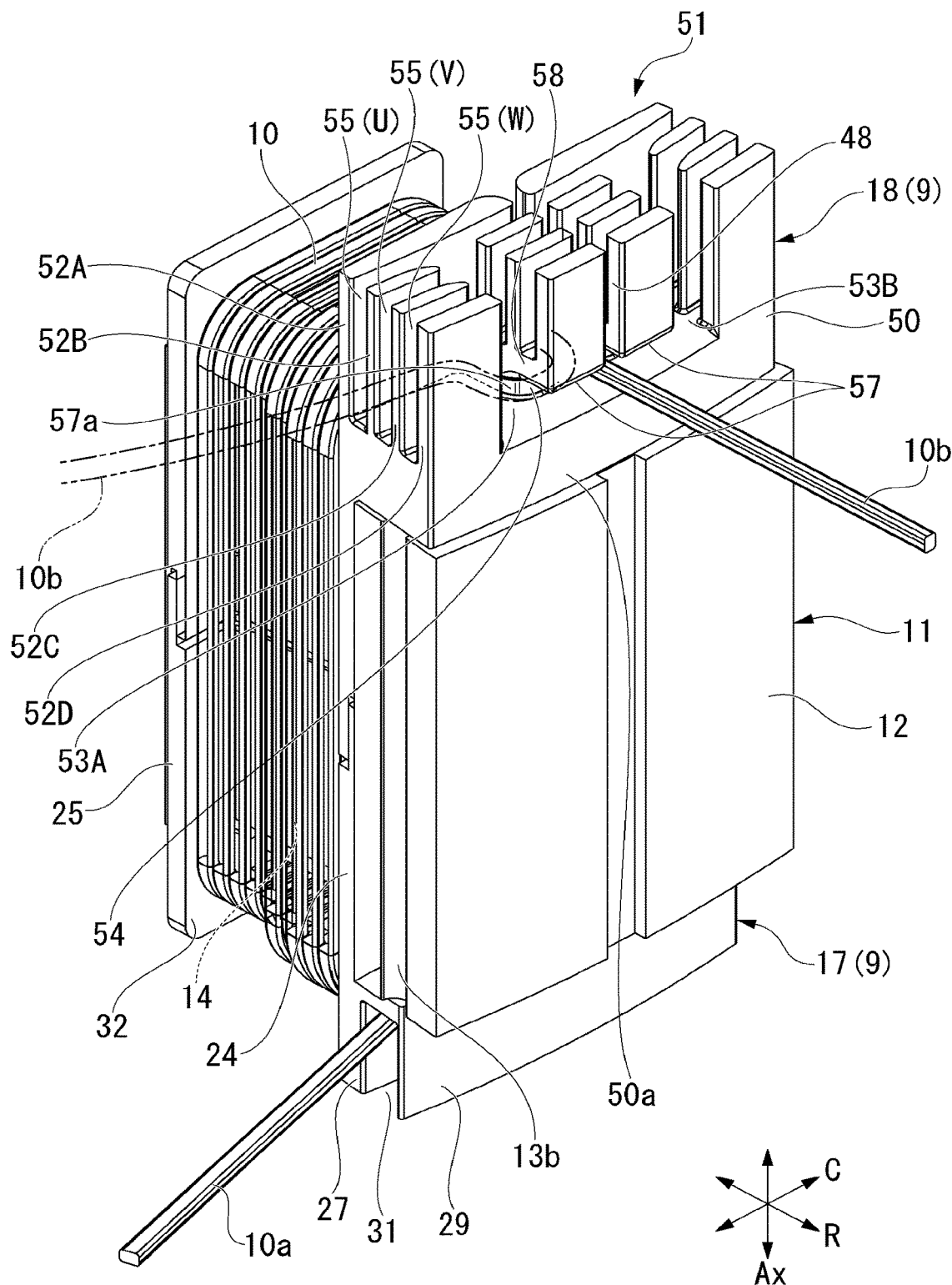
FIG. 5 is a perspective view showing the winding block according to the embodiment when viewed from another direction.
Figure 6:
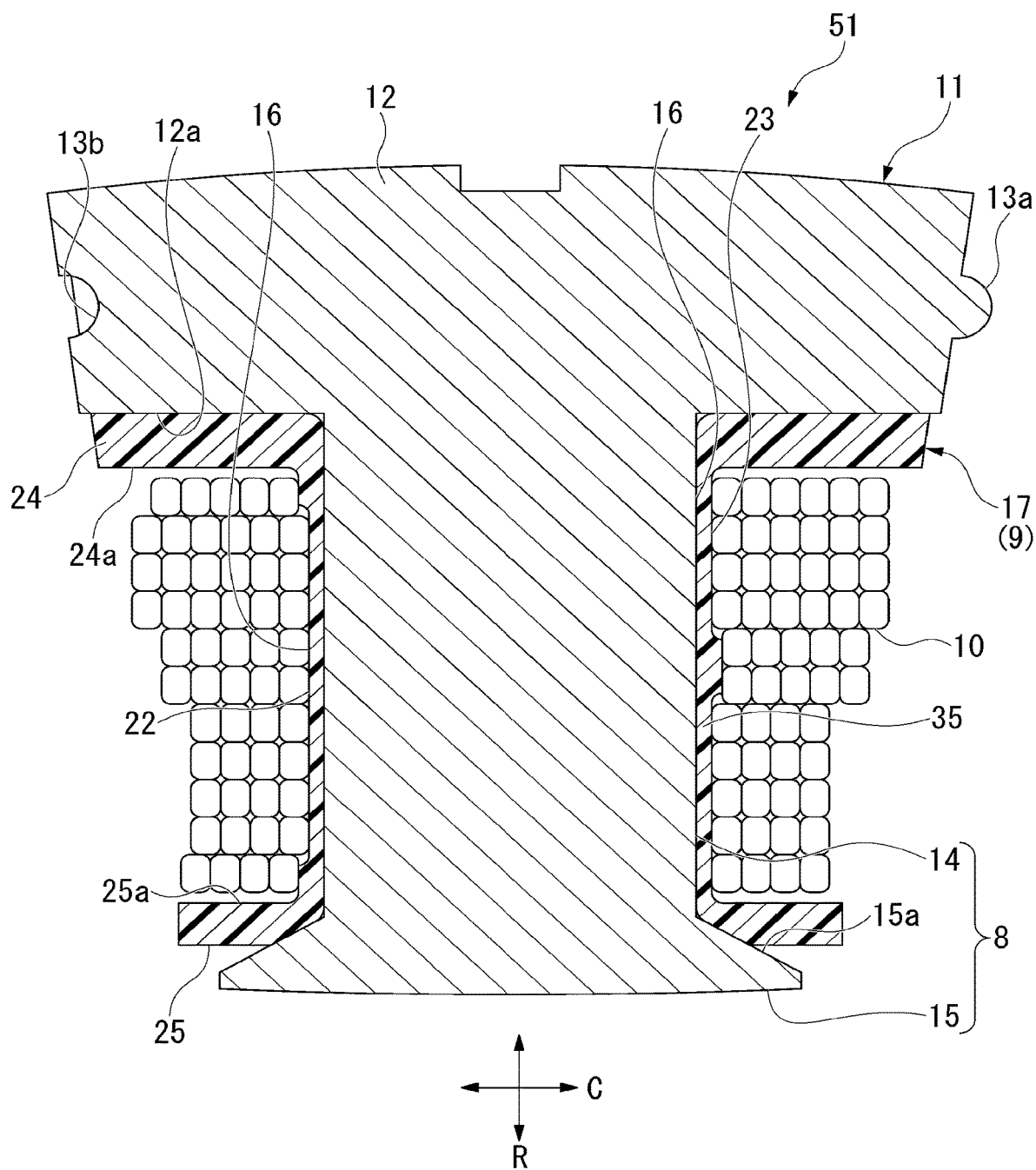
FIG. 6 is a cross-sectional view taken along line VI-VI of FIG. 3.

FIG. 4 is a perspective view showing a winding block 51 in which the coil 10 is wound around the split core 11 with the insulator 9 interposed therebetween. FIG. 4 is a view showing the winding block 51 when viewed from one direction. FIG. 5 is a perspective view showing the winding block 51 when viewed from another direction. Additionally, FIG. 6 is a view taken along line VI-VI of FIG. 3 and is a cross-sectional view showing the winding block 51.

The split core 11 is configured by, for example, stacking a plurality of metal plates in layers. The split core 11 may be formed by pressure forming soft magnetic powder. The split core 11 includes: a back yoke portion 12 that extends in the circumferential direction; and the teeth 8 that protrude from a center of the back yoke portion 12 in the circumferential direction to the inner side in the radial direction.

The back yoke portion 12 is a portion that forms a ring-shaped magnetic path of the stator core 7 when the split cores 11 are coupled in a ring shape. A cross-sectional shape of the back yoke portion 12 in a direction orthogonal to the axial direction is a circular-arc shape.

Connection portions 13a and 13b are formed at both end portions of the back yoke portion 12 in the circumferential direction. Two back yoke portions 12 adjacent to each other are coupled by the connection portions 13a and 13b. Specifically, the two back yoke portions 12 are coupled by pressing the connection portion 13a of one of the back yoke portions (first back yoke portion) of the two back yoke portions 12 adjacent to each other into the connection portion 13b of the other of the back yoke portions (second back yoke portion). The connection portion 13a (first connection portion) which is one of the two connection portions 13a and 13b is formed in a projected shape. The connection portion 13b (second connection portion) which is the other of the two connection portions 13a and 13b is formed in a recessed shape capable of receiving the connection portion 13a.

The teeth 8 include: a teeth main body 14 that extends in the radial direction; and a flange portion 15. The teeth 8 extend to the inner side in the core radial direction that is the radial direction of the stator core 7. The flange portion 15 is located at an end portion on the inner side of the teeth main body 14 in the radial direction. The flange portion 15 is shaped integrally with an edge portion of the teeth main body 14. The flange portion 15 extends to both sides in the circumferential direction.

Accordingly, a slot 16 surrounded by the teeth main body 14, the flange portion 15, and the back yoke portion 12 (inner-side surface 12a of the back yoke portion 12 described below) is formed. A number of windings of the coil 10 (rectangular wire) are wound around the slot 16. That is, on both sides of the teeth 8 of each of the split cores 11, a pair of the slots 16 are formed.

The insulator 9 is configured of a first insulator 17 and a second insulator 18. The first insulator 17 and the second insulator 18 are separable from or coupleable to each other in the axial direction of the teeth 8.

The first insulator 17 is attached to the teeth 8 by moving in one direction (for example, a direction from the upper side of the teeth 8 to the lower side) of the axial direction of the teeth 8 (core axial direction). The first insulator 17 has an engagement portion that engages with the second insulator 18.

The second insulator 18 is attached to the teeth 8 by moving in another direction (for example, a direction from the lower side of the teeth 8 to the upper side) of the axial direction of the teeth 8 (core axial direction). The second insulator 18 has an engagement portion that engages with the first insulator 17.

That is, the insulator 9 has a separate configuration in which two insulators are separable in the axial direction.

In a state in which the insulator 9 is attached to the teeth 8, the first insulator 17 and the second insulator 18 overlap each other without a gap. The teeth 8 are not exposed between the first insulator 17 and the second insulator 18.

The coil 10 is wound around the insulator 9 attached to the teeth 8. In a step of winding the coil 10 around the teeth 8, the coil 10 is initially wound around the first insulator 17 (start of winding). After the winding of the coil 10 with respect to the teeth 8 is completed, a winding-completion end of the coil 10 is drawn out from the second insulator 18.

Figure 7:
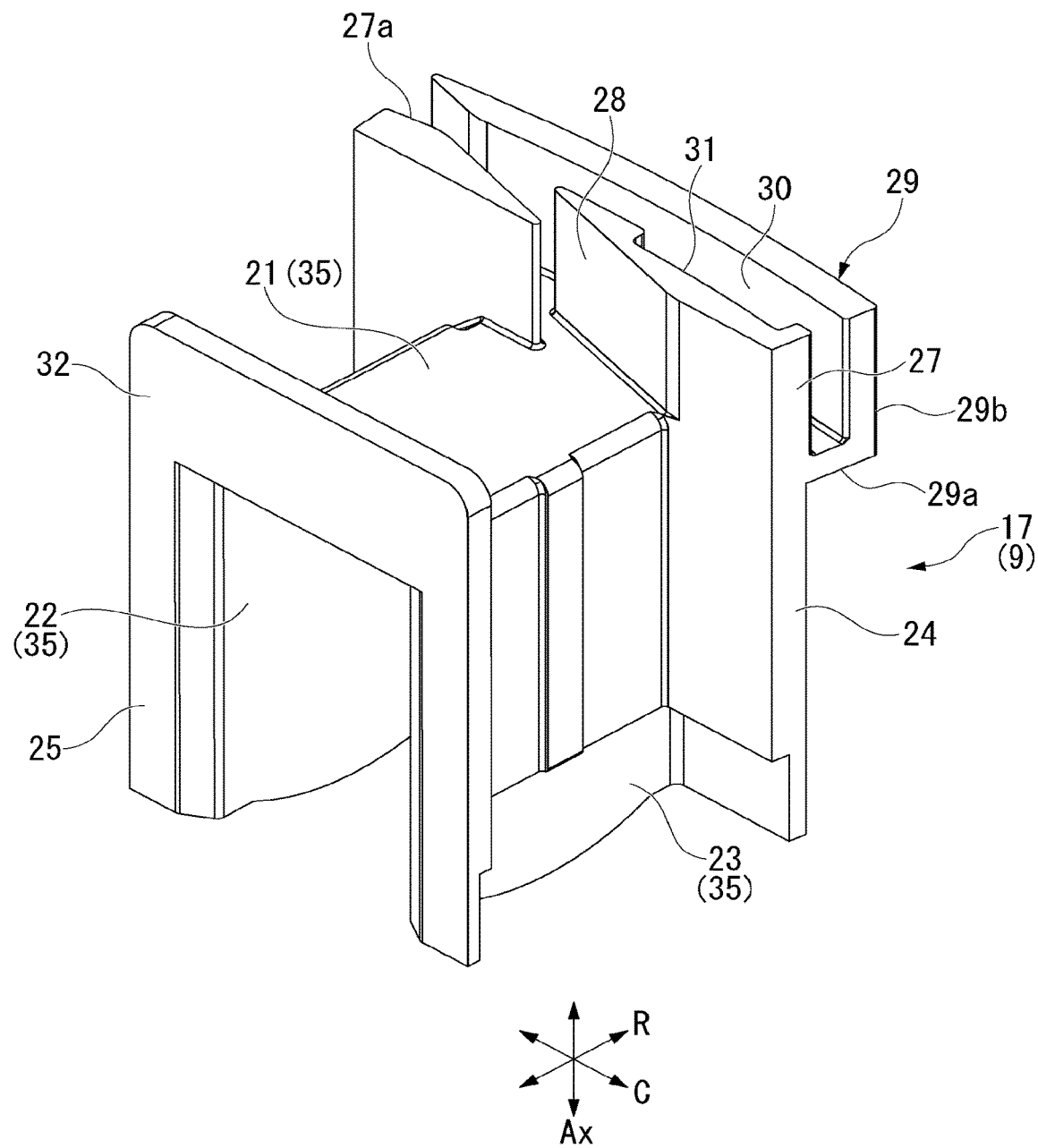
FIG. 7 is a perspective view showing a first insulator according to the embodiment when viewed from one direction.
Figure 8:
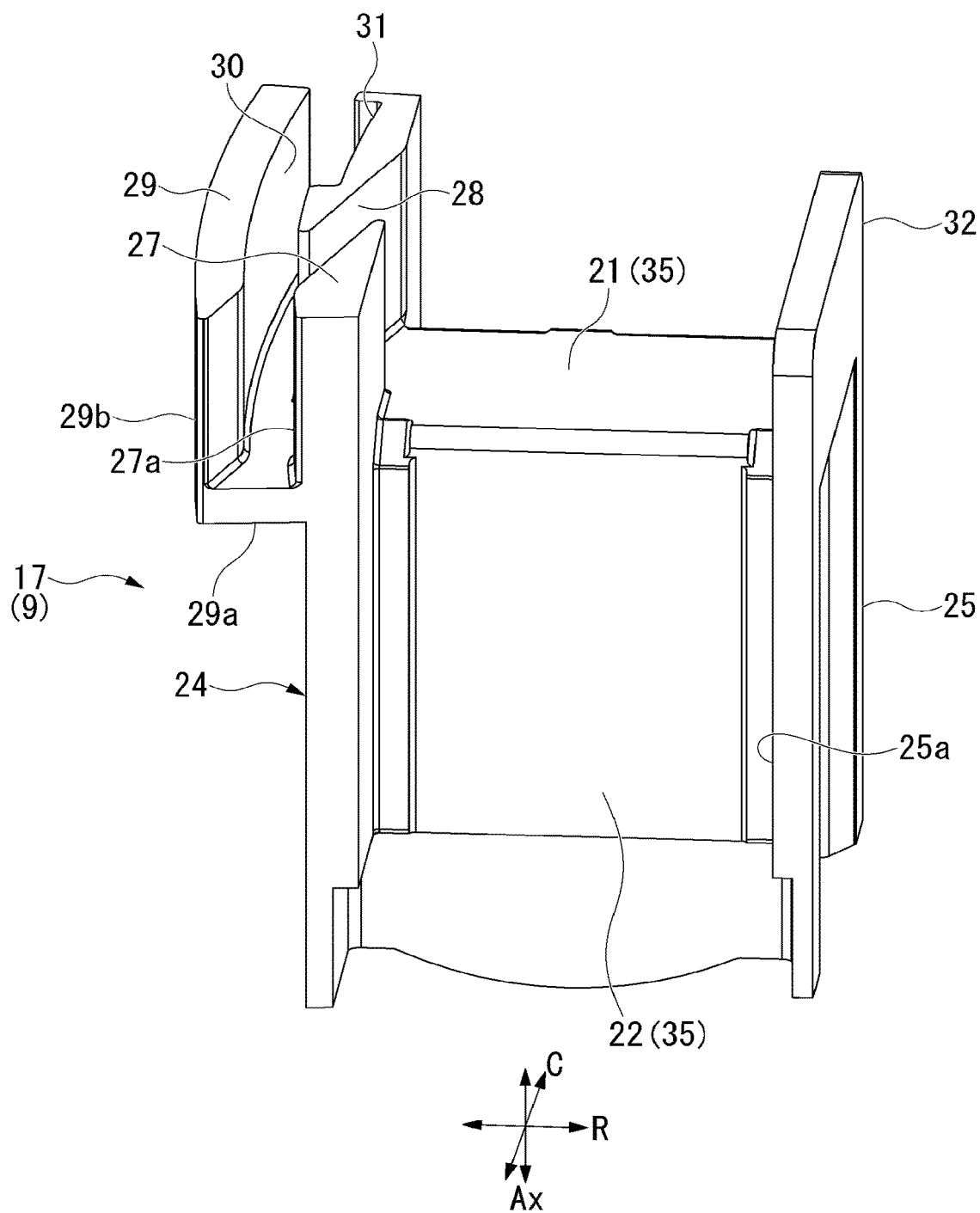
FIG. 8 is a perspective view showing the first insulator according to the embodiment when viewed from another direction.

FIG. 7 is a perspective view showing the first insulator 17 when viewed from one direction. FIG. 8 is a perspective view showing the first insulator 17 when viewed from another direction.

As shown in FIGS. 6 to 8, the first insulator 17 includes: an end-surface cover portion 21 that covers one end surface (first teeth end surface) in the axial direction of the teeth 8 (core axial direction); two side-surface cover portions 22 and 23 (a first side-surface cover portion 22 and a second side-surface cover portion 23) that cover both side surfaces of the teeth 8 in the circumferential direction; an outer-wall portion 24 (first wall portion) that is shaped integrally with an outer end of each of the cover portions 21 to 23 in the radial direction; and an inner-wall portion 25 (second wall portion) that is shaped integrally with an inner end of each of the cover portions 21 to 23 in the radial direction.

The outer-wall portion 24 covers the inner-side surface 12a (refer to FIG. 6) of the back yoke portion 12. The outer-wall portion 24 has an outer-wall protruding portion 27. The outer-wall protruding portion 27 protrudes from one end surface of the back yoke portion 12 of the split core 11 in the axial direction (first back yoke end surface) to the outer side in the axial direction (axial direction one end side). A coil-introduction slit 28 is formed at a center of the outer-wall protruding portion 27 in the circumferential direction. The coil-introduction slit 28 is formed to extend at an angle when viewed from the axial direction and to intersect with the radial direction and the circumferential direction. The coil-introduction slit 28 guides the coil 10 from the outer side of the outer-wall portion 24 in the radial direction into the inner side thereof in the radial direction.

A coil-pressing wall 29 is formed on an outer-side surface 27a of the outer-wall protruding portion 27. The coil-pressing wall 29 houses a crossover-wire portion 10a (refer to FIGS. 4 and 5) of a neutral point of the coil 10 on the outer side of the outer-wall portion 24 in the radial direction. The coil-pressing wall 29 has a bottom wall portion 29a and a side wall portion 29b. The bottom wall portion 29a protrudes from a base of the outer-wall protruding portion 27 in the radially outward direction. The side wall portion 29b is provided upright from an outer end of the bottom wall portion 29a in the radial direction in parallel to the outer-wall protruding portion 27. A crossover-wire storage portion 30 is formed of the bottom wall portion 29a, the side wall portion 29b, and the outer-wall protruding portion 27. The crossover-wire storage portion 30 houses the crossover-wire portion 10a of the neutral point of the coil 10. A recess 31 is formed at a part of the outer-side surface 27a of the outer-wall protruding portion 27 forming the crossover-wire storage portion 30. A connection portion between the crossover-wire portions having phases different from each other is disposed in the recess 31.

The inner-wall portion 25 covers an inner-side surface 15a (a surface on the outer side in the radial direction) of the flange portion 15 of the teeth 8. The inner-wall portion 25 has an inner-wall protruding portion 32 that protrudes from one end surface of the teeth main body 14 in the axial direction to the outer side in the axial direction.

Figure 9:
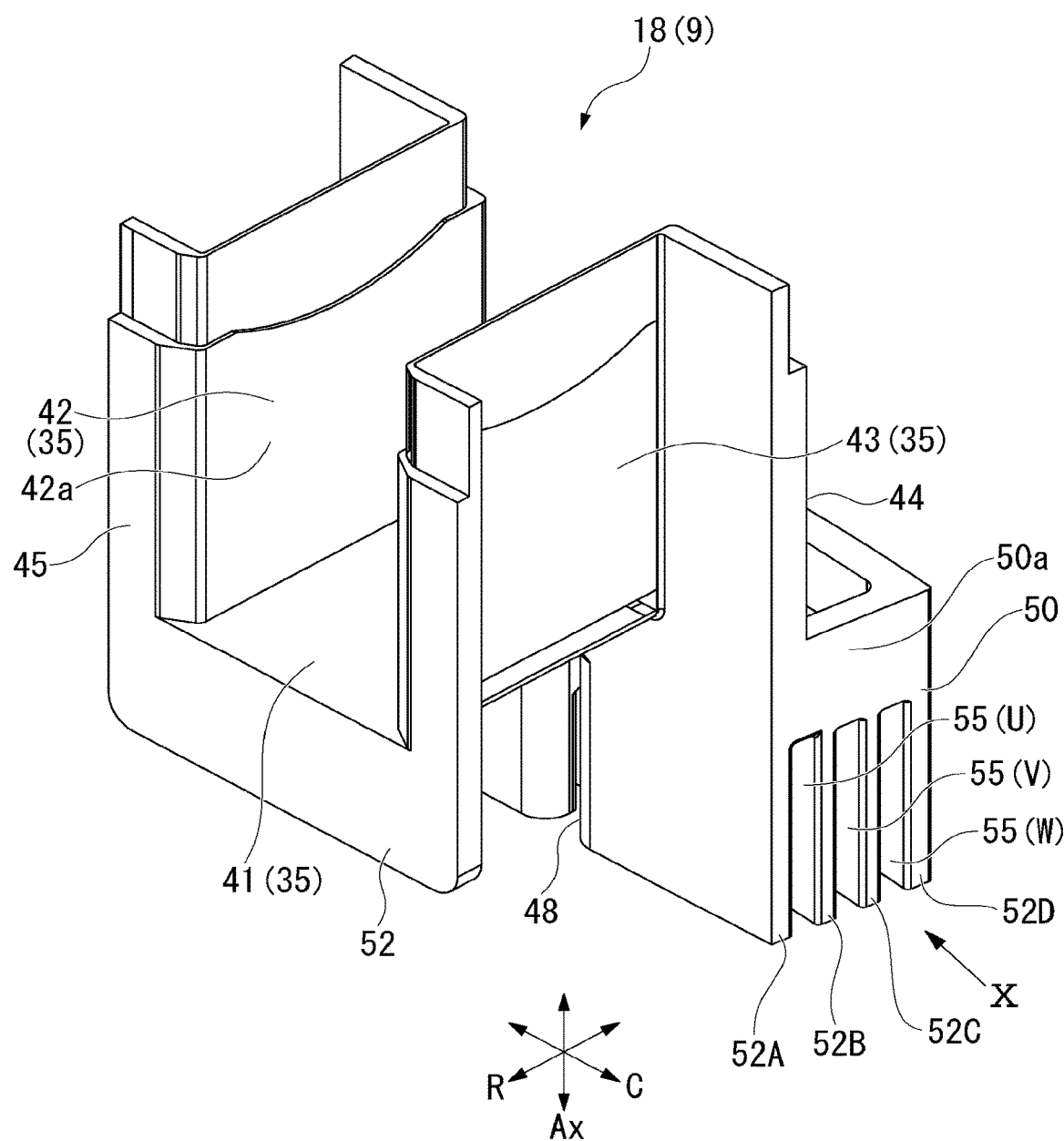
FIG. 9 is a perspective view showing a second insulator according to the embodiment when viewed from one direction.
Figure 10:
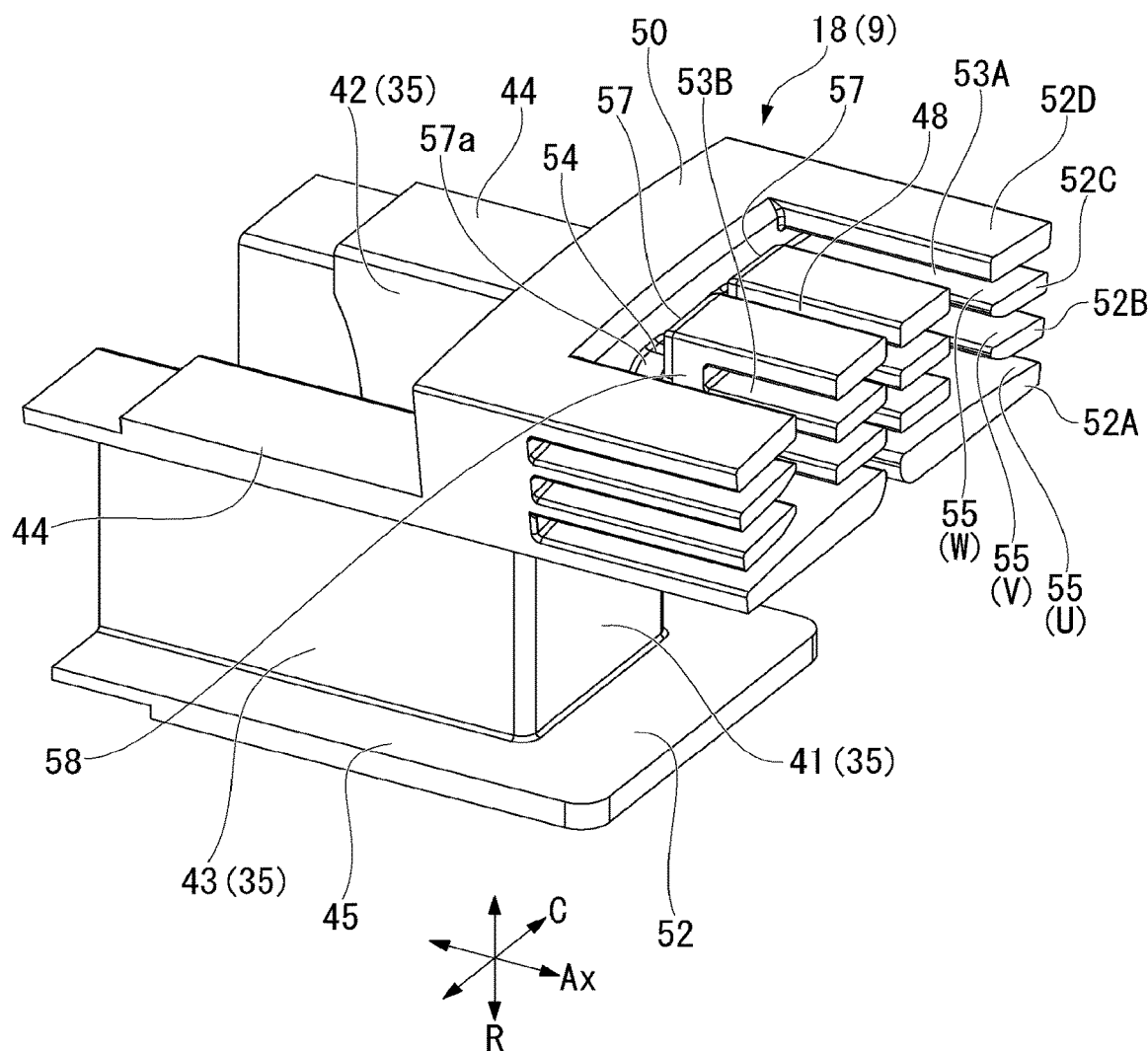
FIG. 10 is a perspective view showing the second insulator according to the embodiment when viewed from a direction of the arrow X of FIG. 9.

FIG. 9 is a perspective view showing the second insulator 18 when viewed from the inner side in the radial direction. FIG. 10 is a perspective view showing the second insulator 18 when viewed from a direction of the arrow X of FIG. 9.

As shown in FIGS. 3, 9, and 10, the second insulator 18 includes: an end-surface cover portion 41 that covers the other end surface (second teeth end surface) in the axial direction of the teeth 8 (core axial direction); two side-surface cover portions 42 and 43 (a first side-surface cover portion 42 and a second side-surface cover portion 43) that cover both side surfaces of the teeth 8 in the circumferential direction; an outer-wall portion 44 that is shaped integrally with an outer end of each of the cover portions 41 to 43 in the radial direction; and an inner-wall portion 45 that is shaped integrally with an inner end of each of the cover portions 41 to 43 in the radial direction.

The outer-wall portion 44 covers the inner-side surface 12a of the back yoke portion 12 of the split core 11. A crossover-wire guide block 50 (crossover-wire guide portion) is formed at the other end (an end portion in a direction from the first insulator 17 to the second insulator 18 in the axial direction) of the outer-wall portion 44 in the axial direction. The outer-wall portion 44 is formed integrally with the crossover-wire guide block 50. The crossover-wire guide block 50 protrudes from the other end surface (first back yoke end surface) of the back yoke portion 12 in the axial direction to the outer side in the axial direction (the other end side in the axial direction), and bulges in the radially outward direction. The crossover-wire guide block 50 is formed in a substantially circular-arc shape along the shape of the back yoke portion 12 of the split core 11 when viewed from the axial direction. The crossover-wire guide block 50 is formed outside a teeth cover portion 35 in the core radial direction.

A drawing groove 48 that penetrates from the inside to the outside in the radial direction (core radial direction) is formed at a substantially center position of the crossover-wire guide block 50 in the circumferential direction. The drawing groove 48 extends from an end surface on the other end side of the crossover-wire guide block 50 in the axial direction to the inside in the axial direction. The drawing groove 48 has a predetermined depth. The depth of the drawing groove 48 is set in accordance with a design of the second insulator 18. A terminal end of the coil 10 wound around the insulator 9 attached to the teeth 8 is a crossover-wire portion 10b on the terminal side. The terminal end of the coil 10 is drawn out from the drawing groove 48 in the radially outward direction. The crossover-wire guide block 50 guides the crossover-wire portion 10b drawn out from the drawing groove 48 into a drawing position (terminal connection portion) of any one of terminals 70U, 70V, and 70W (refer to FIGS. 2 and 3). As shown in FIG. 2, each of the terminals 70U, 70V, and 70W protrudes from an end surface of a specified winding block 51 in the axial direction to the outer side in the axial direction.

That is, the crossover-wire guide block 50 guides: the crossover-wire portion 10b of the coil 10 drawn out from the teeth cover portion 35; and the crossover-wire portion 10b (introduction crossover-wire portion) of the coil 10 (introduction coil) introduced into the crossover-wire guide block 50 and drawn out from a split core (second split core) different from the split core 11 (first split core) including the teeth 8 attached to the teeth cover portion 35 around which the coil 10 is wound, into any one of the drawing positions (terminal connection portion) of the terminals 70U, 70V, and 70W disposed on a circumference substantially along the ring shape of the stator core 7.

In other words, "the crossover-wire portion 10b (introduction crossover-wire portion) of the coil 10 (introduction coil) introduced into the crossover-wire guide block 50 and drawn out from a split core (second split core) different from the split core 11 (first split core) including the teeth 8 attached to the teeth cover portion 35 around which the coil 10 is wound" is an introduction crossover-wire portion of the first split core which does not pass through the drawing groove 48.

The crossover-wire guide block 50 has guide grooves 55. The guide groove 55 guides: the crossover-wire portion 10b of the coil 10 drawn out from the teeth cover portion 35; and the crossover-wire portion 10b (introduction crossover-wire portion) of the coil 10 (introduction coil) introduced into the crossover-wire guide block 50 and drawn out from a split core (second split core) different from the split core 11 (first split core) including the teeth 8 attached to the teeth cover portion 35 around which the coil 10 is wound, substantially in the core circumferential direction that is the circumferential direction of the stator core 7.

Here, "a split core (second split core) different from the split core 11 (first split core)" means another split core different from one split core 11 (first split core) of the plurality of the split cores 11 shown in FIGS. 1 and 2.

Note that, the terminals 70U, 70V, and 70W are disposed away from each other in the circumferential direction of the stator 2.

A specific configuration of the crossover-wire guide block 50 will be described below.

The inner-wall portion 45 covers the inner-side surface 15a (a surface on the outer side in the radial direction) of the flange portion 15 of the teeth 8. An inner-wall protruding portion 52 is formed at the other end (an end portion in a direction from the first insulator 17 to the second insulator 18 in the axial direction) of the inner-wall portion 45 in the axial direction. The inner-wall portion 45 is formed integrally with the inner-wall protruding portion 52. The inner-wall protruding portion 52 protrudes from the other end of the teeth main body 14 in the axial direction (core axial direction) to the outer side in the axial direction (the other end side in the axial direction).

The first insulator 17 and the second insulator 18 cause each of the cover portions 21 to 23 and 41 to 43 to be attached to the outer surface of the teeth main body 14 of the teeth 8. The engagement portion of the first insulator 17 and the engagement portion of the second insulator 18 are fitted to each other in a state in which the first insulator 17 and the second insulator 18 are attached to the outer surface of the teeth main body 14. For example, the engagement portion of the first insulator 17 has a projected portion, and the engagement portion of the second insulator 18 has a recessed portion. The first insulator 17 is combined with the second insulator 18 by fitting the projected portion into the recessed portion. Accordingly, an outer peripheral face of the teeth main body 14 of the teeth 8, the inner-side surface 12a of the back yoke portion 12, and the inner-side surface 15a of the flange portion 15 are covered with the insulators 17 and 18 without a gap.

Note that, in the embodiment, the cover portions 21 to 23 of the first insulator 17 and the cover portions 41 to 43 of the second insulator 18 form the teeth cover portion 35 of the insulator 9. The coil 10 is wound around the periphery of the teeth cover portion of the insulator 9 attached to the teeth 8 by a concentrated winding method.

Next, a specific configuration of the crossover-wire guide block 50 of the second insulator 18 will be described.

Figure 11:
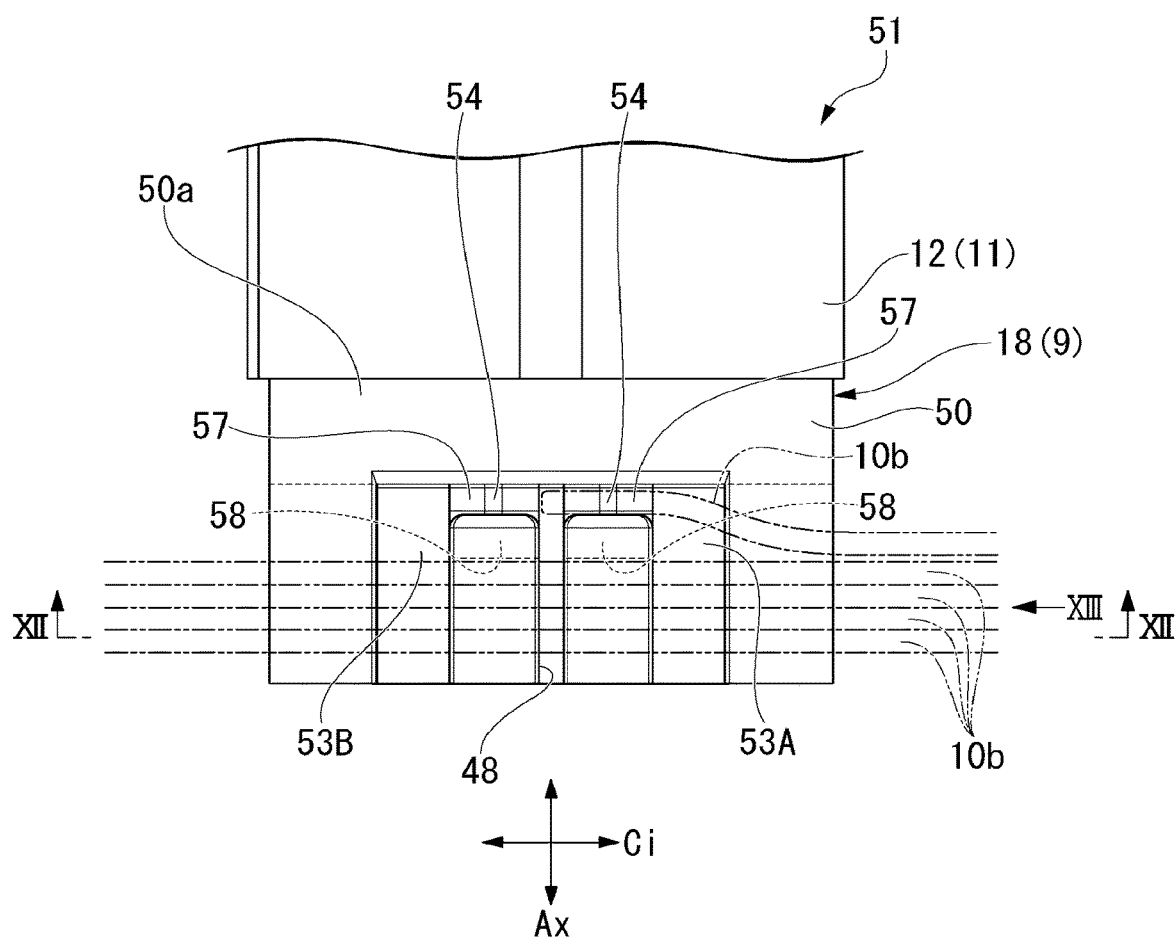
FIG. 11 is a plan view showing the second insulator according to the embodiment and a part of a split core when viewed from a radially outward direction.
Figure 12:
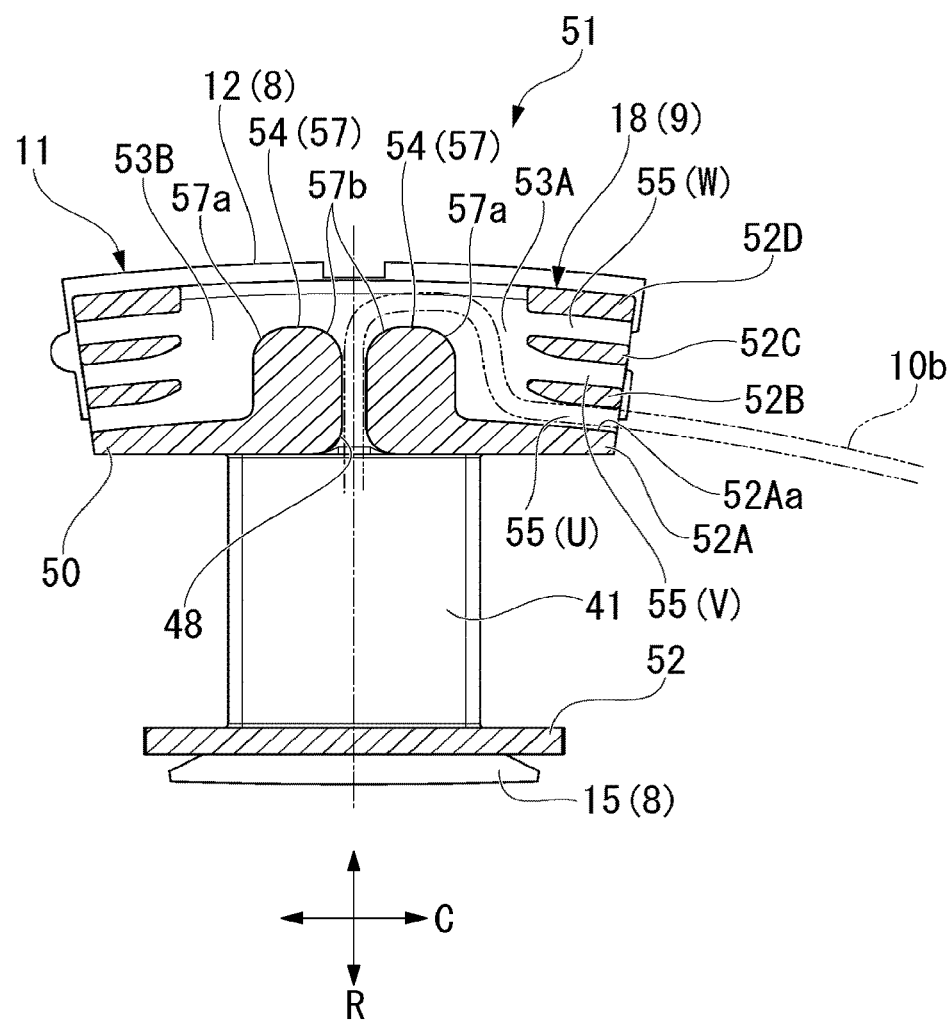
FIG. 12 is a cross-sectional view showing the second insulator according to the embodiment and is a view taken along line XII-XII of FIG. 11.
Figure 13:
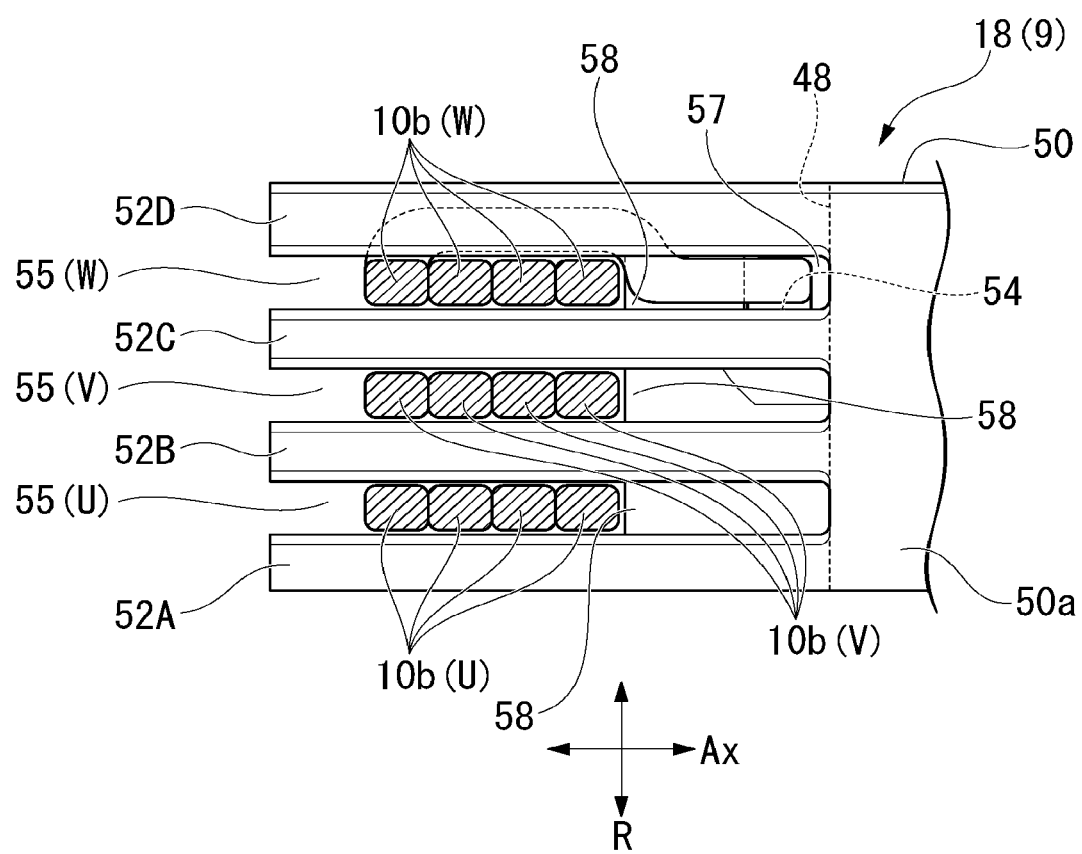
FIG. 13 is a plan view showing the second insulator according to the embodiment when viewed from a direction of the arrow XIII of FIG. 11.
Figure 14:
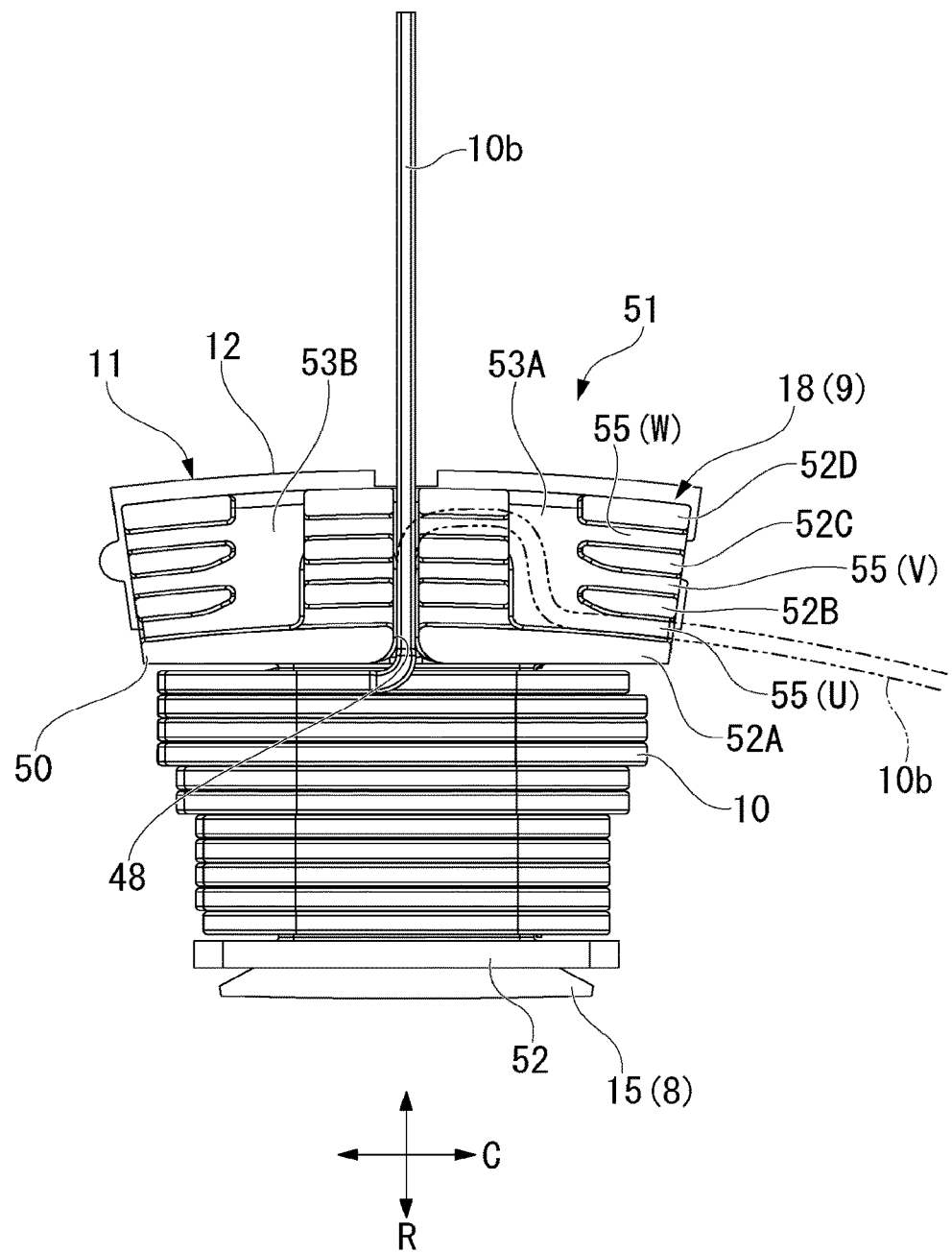
FIG. 14 is a plan view showing the winding block having the insulator (split core) according to the embodiment and a coil assembled therein when viewed from the axial direction.

FIG. 11 is a plan view showing the second insulator 18 and a part of the split core 11 when viewed from the outer side in the radial direction. FIG. 12 is a cross-sectional view showing the second insulator 18 and is a view taken along line XII-XII of FIG. 11. FIG. 13 is a plan view showing the second insulator 18 when viewed from a direction of the arrow XIII of FIG. 11. FIG. 14 is a plan view showing the winding block 51 having the split core 11 (teeth 8) and the coil 10 assembled therein when viewed from the other end side in the axial direction. Note that, FIG. 13 shows the cross-sections of the plurality of the crossover-wire portions 10b to be guided.

The crossover-wire guide block 50 is formed of a block having a substantially circular-arc shape when viewed from the axial direction as mentioned above. In the crossover-wire guide block 50, a plurality of guide walls 52A, 52B, 52C, and 52D, a pair of drawing paths 53A and 53B (a first drawing path 53A and a second drawing path 53B), a crossover-wire support portion 54, a restriction groove 57, and a separation wall 58 are formed as well as the aforementioned drawing groove 48. The crossover-wire guide block 50 has a base portion 50a adjacent to the back yoke portion 12 of the split core 11. The base portion 50a is provided so as to protrude from the outer-wall portion 44 to the outer side in the radial direction.

The guide walls 52A, 52B, 52C, and 52D are formed of walls of four layers having a substantially circular-arc shape when viewed from the axial direction. The guide walls 52A, 52B, 52C, and 52D extend from the base portion 50a to the outer side in the axial direction. The guide walls 52A, 52B, 52C, and 52D are arranged in this order from the inner side to the outer side in the radial direction of the split core 11. In other words, the guide wall 52A corresponds to a first guide wall, the guide wall 52B corresponds to a second guide wall, the guide wall 52C corresponds to a third guide wall, and the guide wall 52D corresponds to a fourth guide wall.

The guide groove 55 is formed so as to extend substantially in the circumferential direction of the stator core 7 between two guide walls adjacent to each other of the guide walls 52A, 52B, 52C, and 52D. The two guide walls forming the guide groove 55 correspond to a first groove-forming wall and a second groove-forming wall.

Since the guide groove 55 is formed between the guide wall 52A and the guide wall 52B, the guide wall 52A corresponds to the first groove-forming wall, and the guide wall 52B corresponds to the second groove-forming wall.

Since the guide groove 55 is formed between the guide wall 52B and the guide wall 52C, the guide wall 52B corresponds to the first groove-forming wall, and the guide wall 52C corresponds to the second groove-forming wall.

Since the guide groove 55 is formed between the guide wall 52C and the guide wall 52D, the guide wall 52C corresponds to the first groove-forming wall, and the guide wall 52D corresponds to the second groove-forming wall.

In each guide groove 55, both end portions of the guide groove 55 in the circumferential direction (core circumferential direction) and one end of the guide groove 55 in the axial direction (core axial direction) open. The crossover-wire portion 10b drawn out from the winding block 51 (first winding block) having the guide groove 55 formed therein and the crossover-wire portion 10b drawn out from the other winding block 51 (second winding block) are insertable into the guide groove 55 in the circumferential direction.

Note that, the aforementioned drawing groove 48 formed at a substantially center of the crossover-wire guide block 50 in the circumferential direction penetrates in the radial direction through substantially the centers of the four guide walls 52A, 52B, 52C, and 52D in the circumferential direction.

In the following description, the coils corresponding to a U-phase, a V-phase, and a W-phase of three-phase alternating current may be referred to as "U-phase coil", "V-phase coil", and "W-phase coil", respectively. The coil has the crossover-wire portion, and the crossover-wire portions corresponding to the U-phase, the V-phase, and the W-phase of the coils may be referred to as "U-phase crossover-wire portion", "V-phase crossover-wire portion", and "W-phase crossover-wire portion", respectively.

In the embodiment, the crossover-wire portion 10b of the U-phase coil 10 is inserted into the inner side of the guide groove 55 located at the innermost side in the radial direction (hereinbelow, may be referred to as "lower-stage guide groove 55 (U)"). The crossover-wire portion 10b of the V-phase coil 10 is inserted into the inner side of the guide groove 55 located close to the outer side of the lower-stage guide groove 55 in the radial direction (hereinbelow, may be referred to as "middle-stage guide groove 55 (V)"). Furthermore, the crossover-wire portion 10b of the W-phase coil 10 is inserted into the inner side of the guide groove 55 located at the outermost in the radial direction (hereinbelow, may be referred to as "upper-stage guide groove 55 (W)"). A maximum of four crossover-wire portions 10b are inserted into each guide groove 55 (refer to FIG. 13).

Figure 15:
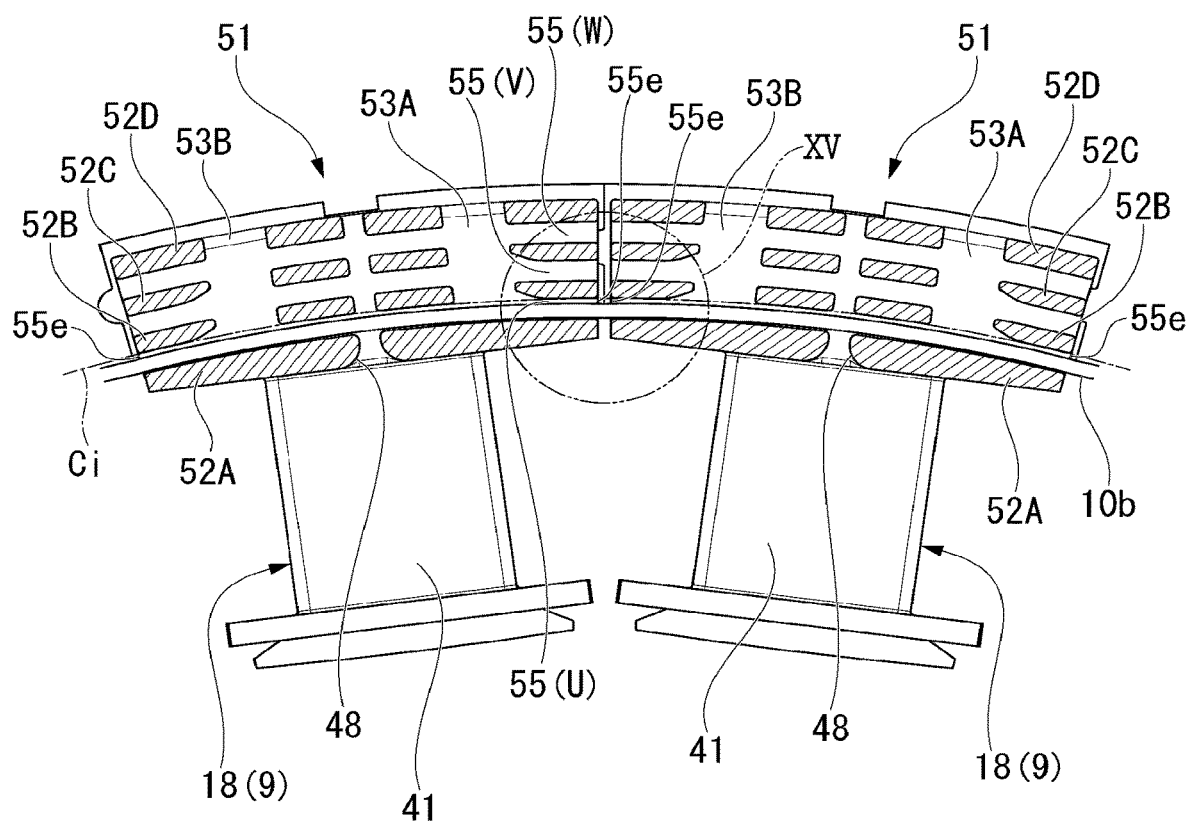
FIG. 15 is a view taken along line XII-XII of FIG. 11 and is a partial cross-sectional view showing two winding blocks and a crossover-wire portion.
Figure 16:
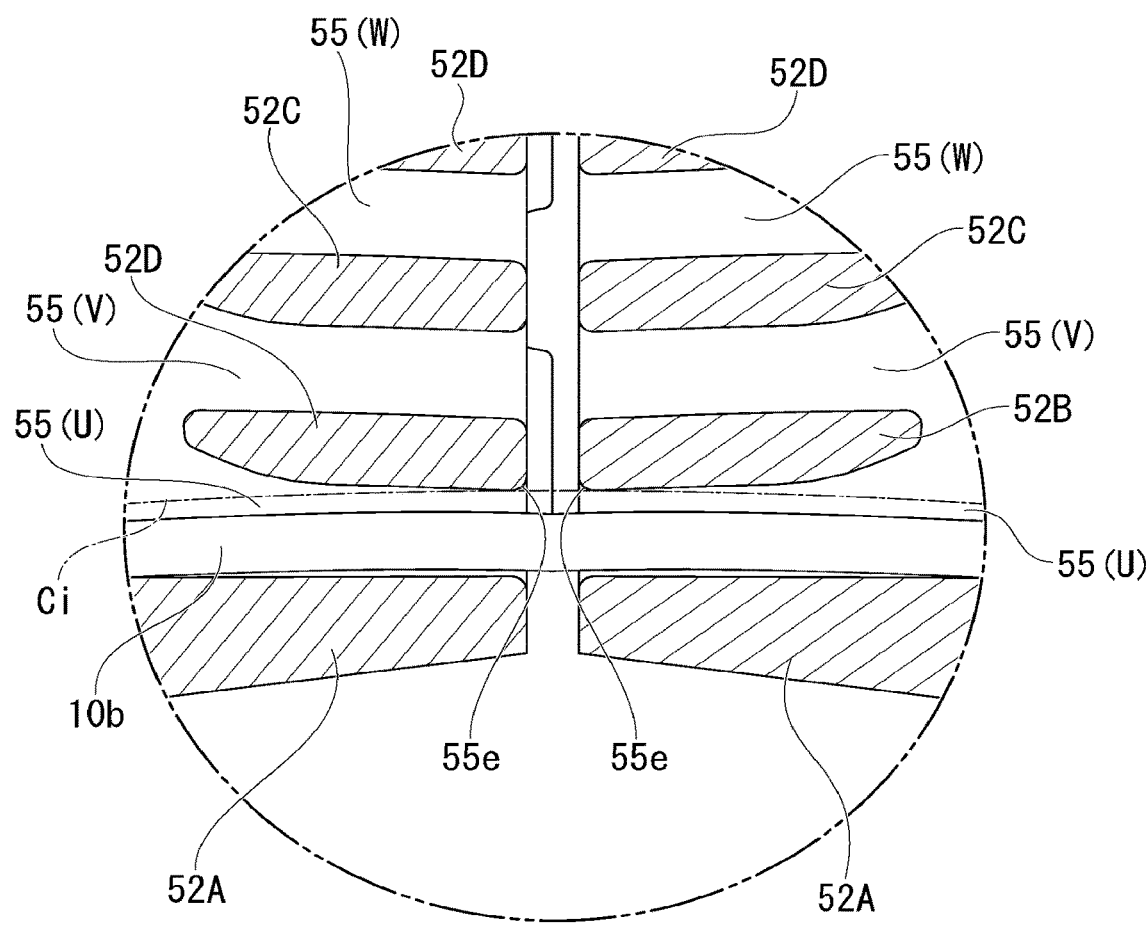
FIG. 16 is an enlarged view showing a portion represented by XV of FIG. 15.

FIG. 15 is a view taken along line XII-XII of FIG. 11 and is a partial cross-sectional view showing two winding blocks 51 and a crossover-wire portion 10b. FIG. 16 is an enlarged view showing a portion represented by XV of FIG. 15.

Each of the three guide grooves 55 (U), 55 (V), and 55 (V) of the crossover-wire guide block 50 has a shape having a center corresponding to the ring center c of the stator core 7 (coincides with the rotation axis c shown in FIGS. 1 and 2) and not coinciding with a circular arc of a circle having a fixed radius. Specifically, each of the guide grooves 55 is formed in a circular-arc shape having a radius of curvature smaller than that of a circular arc of a virtual circle Ci. The center of the virtual circle Ci corresponds to the ring center c of the stator core 7. The outer-periphery of the virtual circle Ci passes through both end portions 55e of the guide groove 55 in the circumferential direction. That is, of the four guide walls 52A, 52B, 52C, and 52D forming each guide groove 55, the surface of the guide wall which faces at least the guide groove 55 is a circular-arc surface having a radius of curvature smaller than the circular arc of the virtual circle Ci.

Additionally, the drawing path 53A is formed at the position away from the drawing groove 48 in a direction toward one end side of the crossover-wire guide block 50 in the circumferential direction (at the right side of the drawing groove 48 in FIG. 11). The drawing path 53A does not penetrate through the guide wall 52A (inner guide wall) located at an innermost side in the radial direction. The drawing path 53A penetrates through the remaining guide walls 52D, 52C, and 52B in the radial direction. That is, of the guide walls 52D, 52C, 52B, and 52A, the drawing path 53A penetrates through the guide walls 52D, 52C, and 52B other than the guide wall 52A in the core radial direction.

Similarly, the drawing path 53R is formed at the position away from the drawing groove 48 in a direction toward the other end side of the crossover-wire guide block 50 in the circumferential direction (at the left side of the drawing groove 48 in FIG. 11). The drawing path 53B does not penetrate through the guide wall 52A (inner guide wall) located at an innermost side in the radial direction. The drawing path 53B penetrates through the remaining guide walls 52D, 52C, and 52B in the radial direction. That is, of the guide walls 52D, 52C, 52B, and 52A, the drawing path 53B penetrates through the guide walls 52D, 52C, and 52B other than the guide wall 52A in the core radial direction.

A cutout extending in the axial direction from the base portion 50a of the crossover-wire guide block 50 to the end portion is formed at each of the guide walls 52D, 52C, and 52B. The two drawing paths 53A and 53B are formed by the cutout formed at the guide wall as described above.

When the crossover-wire portion 10b drawn out from the drawing groove 48 in the radially outward direction is drawn to one side in the circumferential direction through any one of the guide grooves 55, it is possible to draw the crossover-wire portion 10b around the inside of the first drawing path 53A.

For example, there is a case in which the U-phase crossover-wire portion 10b drawn out from the drawing groove 48 in the radially outward direction is drawn to one side in the circumferential direction (clockwise direction) through the lower-stage guide groove 55 (U). In this case, as shown by a virtual line (chain double-dashed line) in FIGS. 5 and 11 to 14, the crossover-wire portion 10b is adequately bent in the drawing path 53A in the radially inward direction, the axial direction, and the circumferential direction, and is inserted into one side region of the lower-stage guide groove 55 (U) in the circumferential direction. In other words, the crossover-wire portion 10b is inserted into the lower-stage guide groove 55 (U) located next to the drawing path 53A in the clockwise direction.

Furthermore, when the V-phase crossover-wire portion 10b is drawn to one side in the circumferential direction through the guide groove 55 (V), in a manner similar to the above case, the crossover-wire portion 10b is inserted into one side region of the guide groove 55 (V) in the circumferential direction while being bent in the drawing path 53A. In other words, the crossover-wire portion 10b is inserted into the guide groove 55 (V) located next to the drawing path 53A in the clockwise direction.

Furthermore, when the W-phase crossover-wire portion 10b is drawn to one side in the circumferential direction through the guide groove 55 (W), in a manner similar to the above case, the crossover-wire portion 10b is inserted into one side region of the guide groove 55 (W) in the circumferential direction while being bent in the drawing path 53A. In other words, the crossover-wire portion 10b is inserted into the guide groove 55 (W) located next to the drawing path 53A in the clockwise direction.

Figure 17:
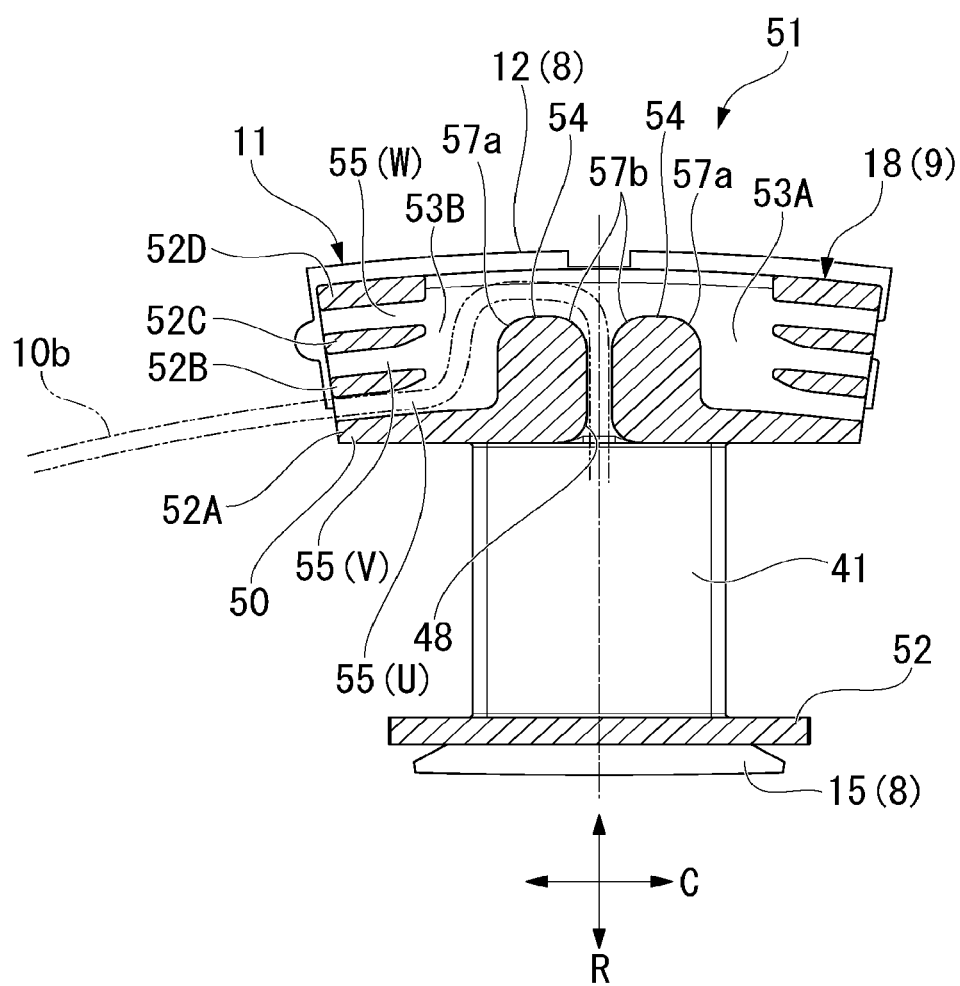
FIG. 17 is a view showing the second insulator according to the embodiment and is a cross-sectional view taken along line XII-XII of FIG. 11.

FIG. 17 is a cross-sectional view corresponding to FIG. 12. FIG. 17 shows a case of drawing the crossover-wire portion 10b from the other region of the lower-stage guide groove 55 (U) in the circumferential direction.

When the crossover-wire portion 10b drawn out from the drawing groove 48 in the radially outward direction is drawn to the other side in the circumferential direction (in a direction opposite to one side in circumferential direction described above) through any one of the guide grooves 55, it is possible to draw the crossover-wire portion 10b around the inside of the second drawing path 53B.

For example, there is a case in which the U-phase crossover-wire portion 10b drawn out from the drawing groove 48 in the radially outward direction is drawn to the other side in the circumferential direction (counterclockwise direction) through the lower-stage guide groove 55 (U). In this case, as shown by a virtual line (chain double-dashed line) in FIG. 17, the crossover-wire portion 10b is adequately bent in the drawing path 53B in the radially inward direction, the axial direction, and the circumferential direction, and is inserted into the other side region of the lower-stage guide groove 55 (U) in the circumferential direction. In other words, the crossover-wire portion 10b is inserted into the lower-stage guide groove 55 (U) located next to the drawing path 53B in the counterclockwise direction.

Furthermore, when the V-phase crossover-wire portion 10b is drawn to the other side in the circumferential direction through the guide groove 55 (V), in a manner similar to the above case, the crossover-wire portion 10b is inserted into the other side region of the guide groove 55 (V) in the circumferential direction while being bent in the drawing path 53B. In other words, the crossover-wire portion 10b is inserted into the guide groove 55 (V) located next to the drawing path 53B in the counterclockwise direction.

Furthermore, when the W-phase crossover-wire portion 10b is drawn to the other side in the circumferential direction through the guide groove 55 (W), the crossover-wire portion 10b is inserted into the other side region of the guide groove 55 (W) in the circumferential direction while being bent in the drawing path 53B in a manner similar to the above case. In other words, the crossover-wire portion 10b is inserted into the guide groove 55 (W) located next to the drawing path 53B in the counterclockwise direction.

Two crossover-wire support portions 54 (a first crossover-wire support portion and a second crossover-wire support portion) are formed at both sides of an end portion of the base portion 50a of the drawing groove 48 of the crossover-wire guide block 50 in the circumferential direction. The first crossover-wire support portion is located next to the drawing groove 48 in a clockwise direction. The first crossover-wire support portion changes the direction of the crossover-wire portion 10b drawn out from the drawing groove 48 to a direction toward the drawing path 53A and supports the crossover-wire portion 10b. The second crossover-wire support portion is located next to the drawing groove 48 in a counterclockwise direction. The second crossover-wire support portion changes the direction of the crossover-wire portion 10b drawn out from the drawing groove 48 to a direction toward the drawing path 53B and supports the crossover-wire portion 10b.

The two crossover-wire support portions 54 are each a block provided to protrude from the base portion 50a of the crossover-wire guide block 50 at a position sandwiched between the drawing groove 48 and the drawing path 53A and at a position sandwiched between the drawing groove 48 and the drawing path 53B.

Moreover, the separation wall 58 having a thickness in the axial direction is disposed adjacent to the outside of each crossover-wire support portion 54 in the axial direction. A center region in the circumferential direction of the three guide walls 52D, 52C, and 52B separated by the two drawing paths 53A and 53B extends from an end surface of the separation wall 58 in the axial direction to the outside in the axial direction. Consequently, displacement of the crossover-wire portion 10b inserted into each of the guide grooves 55 (U), 55 (V), and 55 (W) and guided in the circumferential direction is restricted. That is, displacement of the crossover-wire portion 10b to the inside in the axial direction (in a direction of approaching the restriction groove 57 described below) is restricted by the separation wall 58. The separation wall 58 separates the crossover-wire portion 10b guided into each of the guide grooves 55 (U), 55 (V), and 55 (W) from the restriction groove 57 to the outside in the axial direction.

In a case according to the embodiment, the crossover-wire support portions 54 are located at both sides of the drawing groove 48 in the circumferential direction. The outer-side surface of the crossover-wire support portion 54 in the radial direction is depressed with respect to the separation wall 58 adjacent thereto or the outer-side surface of the base portion 50a in the radial direction in a recessed shape. The outer-side surface of the crossover-wire support portion 54 in the radial direction forms the restriction groove 57 extending in the circumferential direction between the side surface of the base portion 50a and the side surface of the separation wall 58 adjacent thereto. The crossover-wire portion 10b drawn out from the drawing groove 48 to the outer side in the radial direction and changed in direction toward each of the drawing paths 53A and 53B is inserted into the restriction groove 57. By insertion of the crossover-wire portion 10b into the restriction groove 57, displacement of the crossover-wire portion 10b toward the outside in the axial direction is restricted.

A bottom surface of the restriction groove 57 formed by the outer-side surface of the crossover-wire support portion 54 in the radial direction is curved in a circular-arc shape such that an outer edge in the circumferential direction faces the drawing paths 53A and 53B. The curving shape of the bottom surface of the restriction groove 57 is a shape such that the height thereof in the radial direction becomes lower in a direction toward each of the drawing paths 53A and 53B. Note that, in FIGS. 10, 12, and 17, a curving-shaped portion on a bottom surface of the restriction groove 57 is represented by reference numeral 57a. Moreover, on the bottom surface of the restriction groove 57, an edge located inside in the circumferential direction is also curved in a circular-arc shape so as to face a drawing groove 47. In FIGS. 12 and 17, the curving-shaped portion inside in the circumferential direction is represented by reference numeral 57b.

Incidentally, in the winding block 51 configured as described above, for example, the coils 10 of the U-phase, the V-phase, and the W-phase are continuously disposed in the circumferential direction in this order. A winding-start end and a winding-completion end of the coils 10 drawn out from the teeth cover portion 35 of the insulator 9 of each of the winding blocks 51 are connected.

Figure 18:
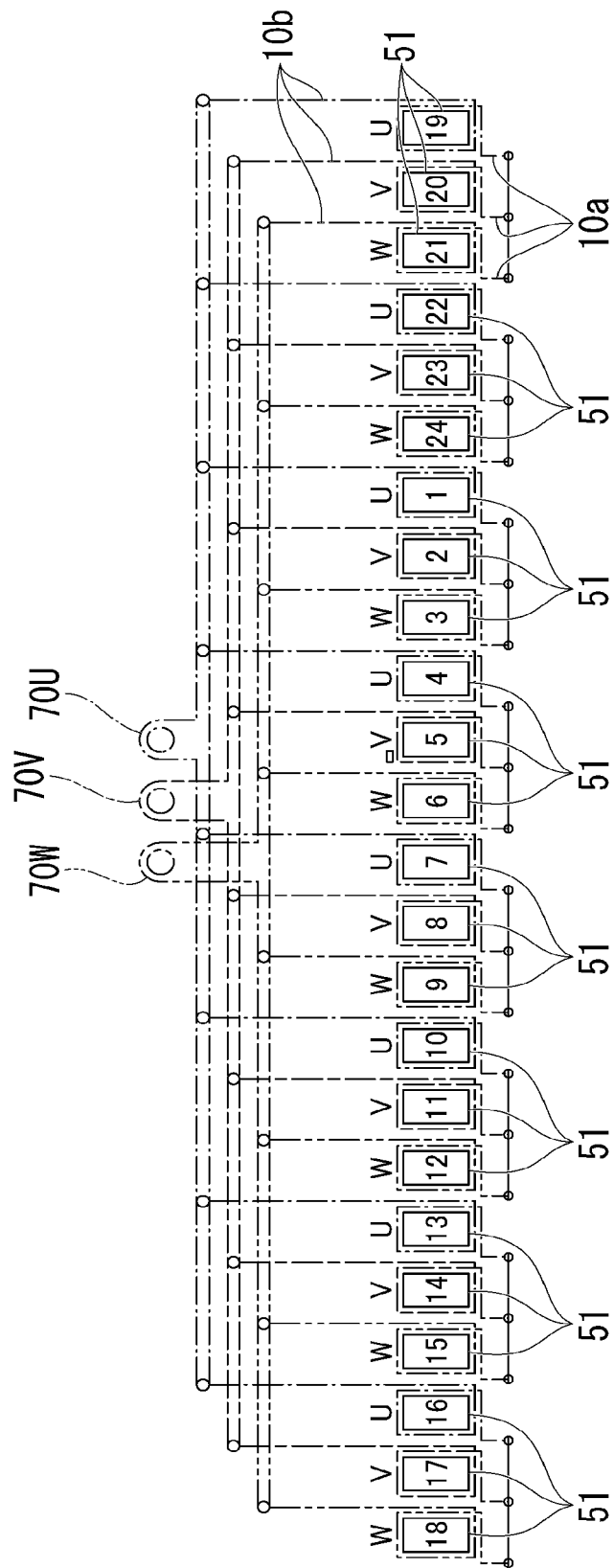
FIG. 18 is a connection diagram of a stator according to the embodiment.

FIG. 18 is a connection diagram of the stator 2 according to the embodiment.

As shown in FIG. 18, the stator 2 is configured of three phases (U-phase, V-phase, and W-phase), and the coils 10 are star-connected (Y-connection). Specifically, the crossover-wire portion 10a of the coil 10 drawn out from the coil-introduction slit 28 of the first insulator 17 is a neutral point, and the coils 10 with three phases are connected to each other at the neutral point. The crossover-wire portion 10b of the coil 10 drawn out from the drawing groove 48 of the second insulator 18 is a crossover-wire portion at which the coils having the same phase are connected to each other. The crossover-wire portions 10b of the U-phase, the V-phase, and the W-phase are connected to the terminals 70U, 70V, and 70W, respectively.

Figure 19:
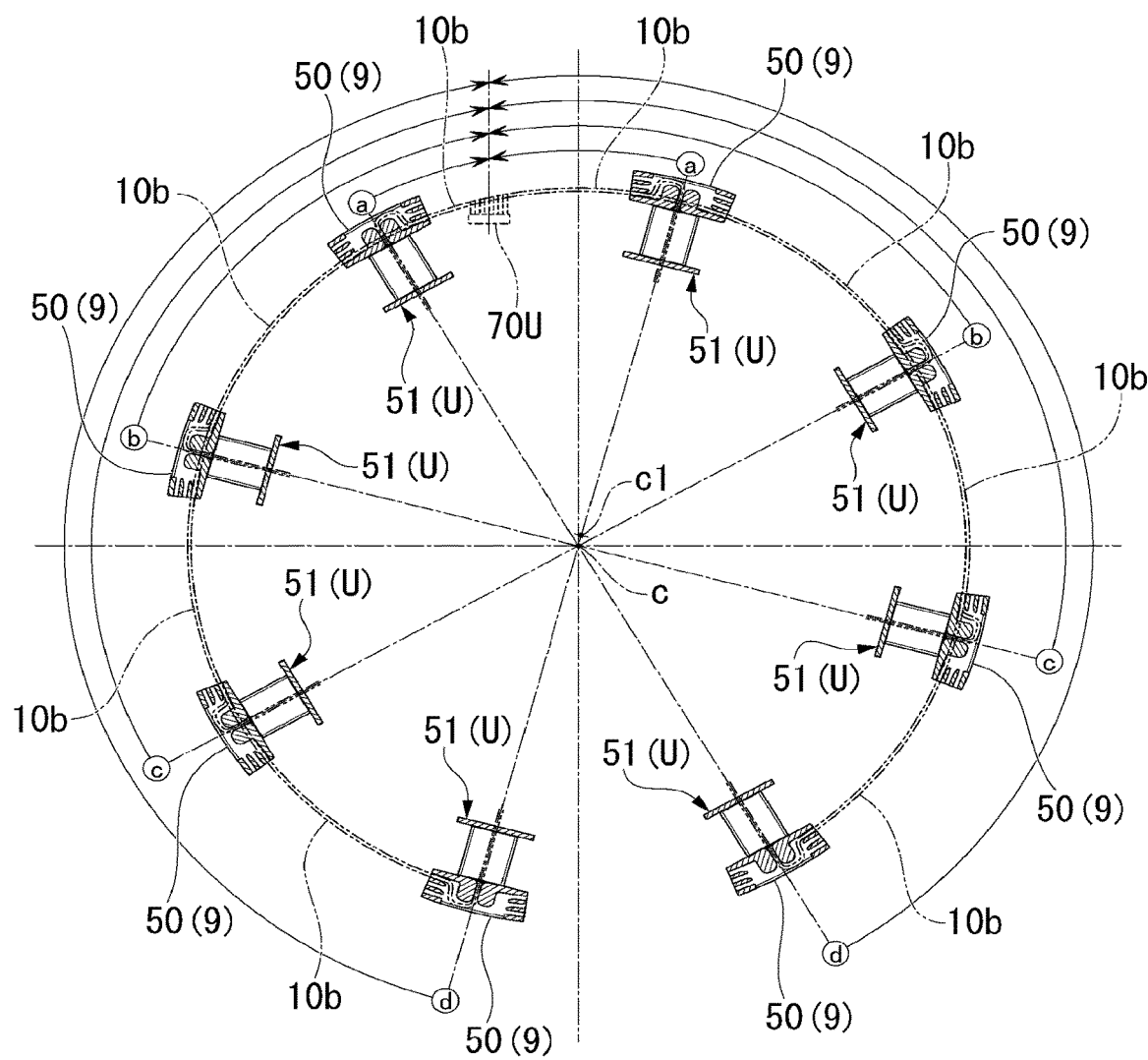
FIG. 19 is a diagram showing a connection state of a coil in a U-phase winding block according to the embodiment.

FIG. 19 is a diagram only showing a U-phase connection state in which the plurality of the winding blocks 51 are assembled in a ring shape and the crossover-wire portion 10b of each of the winding blocks 51 is connected to the terminal 70U.

Figure 20:
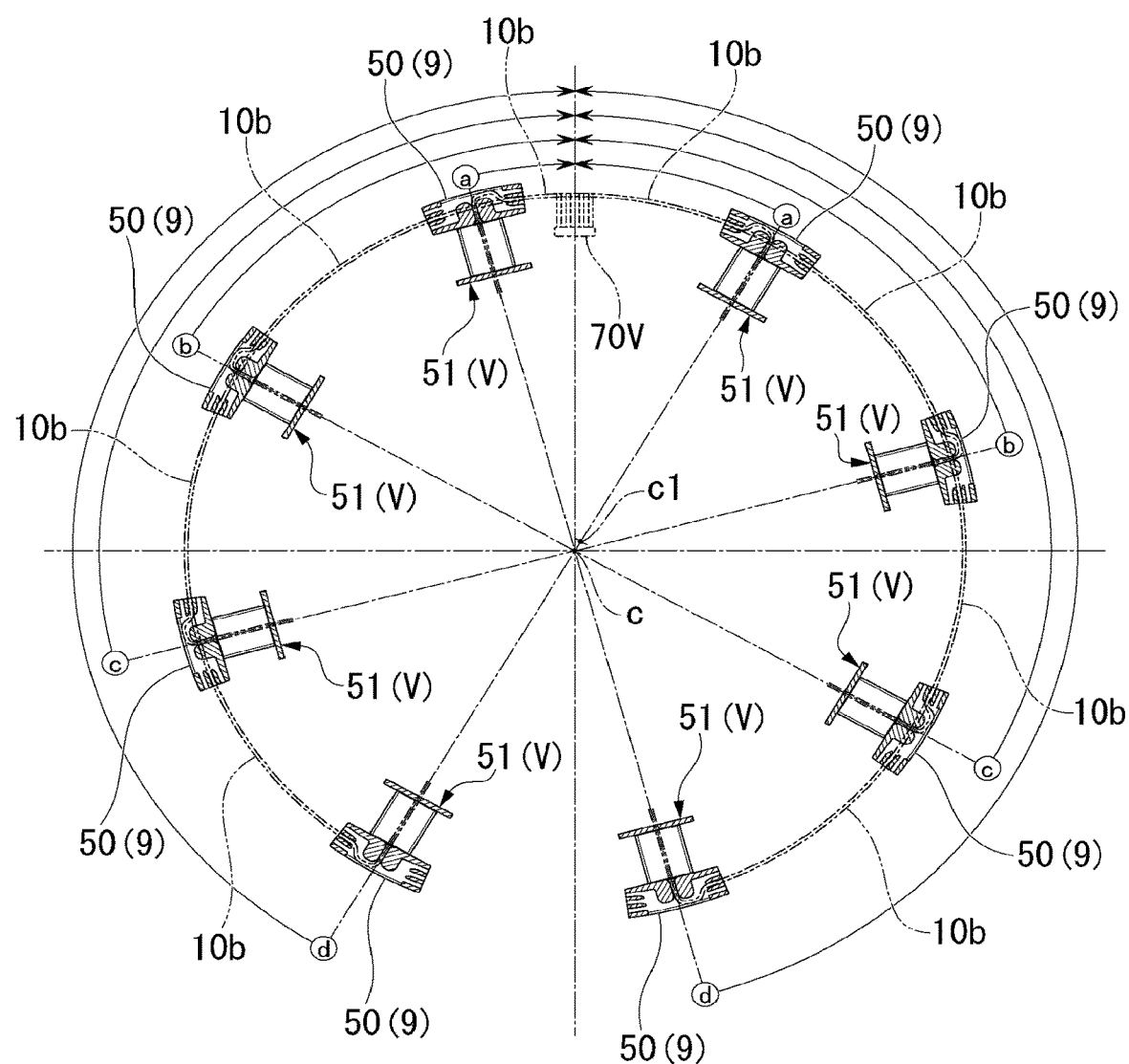
FIG. 20 is a diagram showing a connection state of a coil in a V-phase winding block according to the embodiment.

FIG. 20 is a diagram only showing a V-phase connection state in which the plurality of the winding blocks 51 are assembled in a ring shape and the crossover-wire portion 10b of each of the winding blocks 51 is connected to the terminal 70V.

Figure 21:
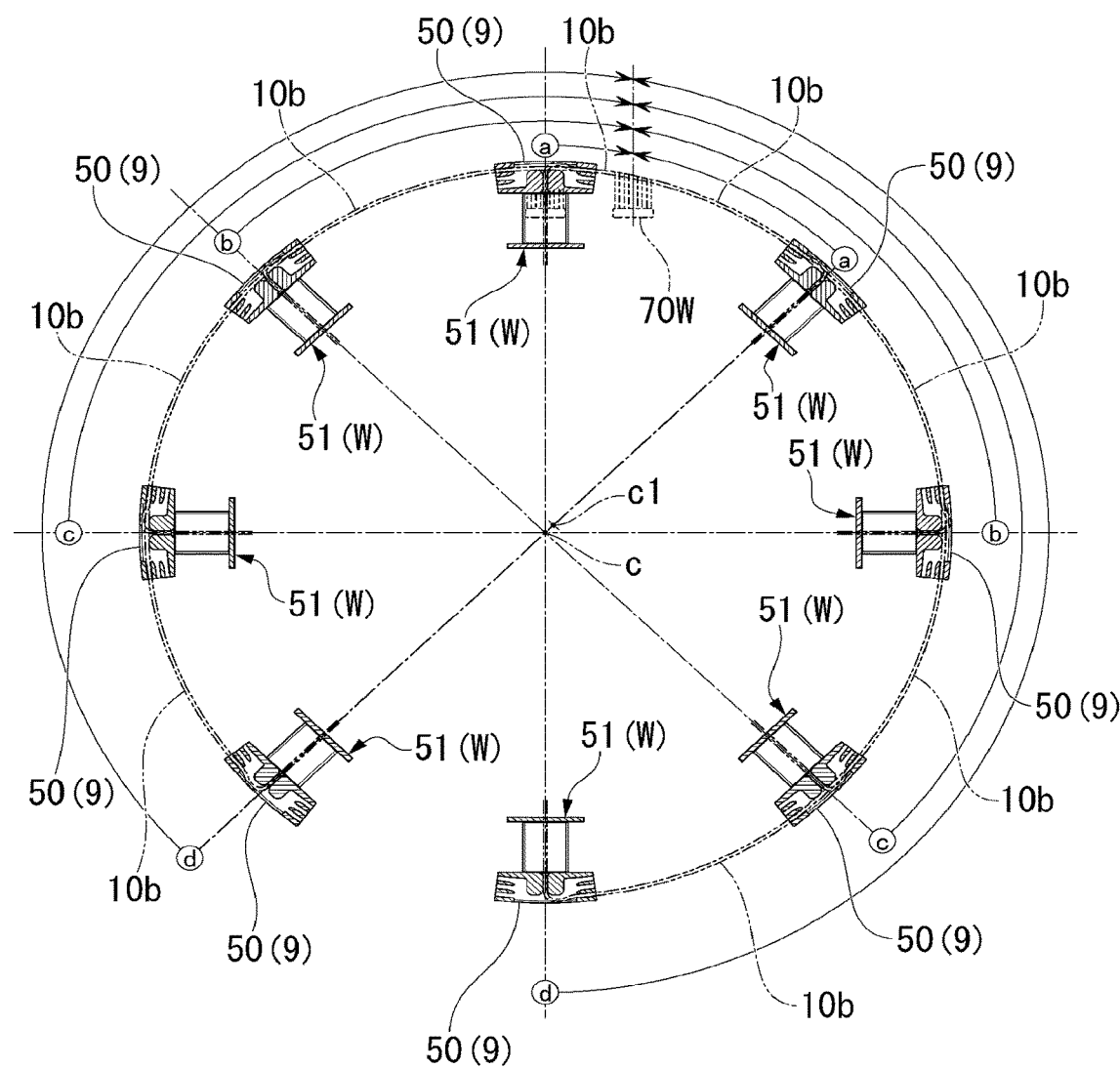
FIG. 21 is a diagram showing a connection state of a coil in a W-phase winding block according to the embodiment.

FIG. 21 is a diagram only showing a W-phase connection state in which the plurality of the winding blocks 51 are assembled in a ring shape and the crossover-wire portion 10b of each of the winding blocks 51 is connected to the terminal 70W.

Note that, reference numeral cl in FIGS. 19 to 21 is a circular-arc center of the circular-arc shape of the guide groove 55 of each insulator 9.

For example, on the circumference along the circular ring shape of the stator 2, the U-phase line shown in FIG. 19 includes four winding blocks 51 arranged in the clockwise direction from the terminal 70U and four winding blocks 51 arranged in the counterclockwise direction from the terminal 70U. In other words, the four winding blocks 51 are arranged at each of a left region and a right region of FIG. 19.

In the winding blocks 51 represented by symbols a, b, c, and d in the left region of FIG. 19, the crossover-wire portion 10b is drawn out from one end side of the crossover-wire guide block 50 in the circumferential direction as shown in FIG. 12. Furthermore, in the winding blocks 51 represented by symbols a, b, c, and d in the right region of FIG. 19, the crossover-wire portion 10b is drawn out from the other end side of the crossover-wire guide block 50 in the circumferential direction as shown in FIG. 17.

In FIG. 19, the crossover-wire portion 10b drawn out from the crossover-wire guide block 50 represented by symbol d passes through the insides of the crossover-wire guide blocks 50 (guide groove 55 (U)), which are represented by symbols c, b, and a and are arranged in the circumferential direction toward the drawing position (terminal connection portion) of the terminal 70U in order. The crossover-wire portion 10b is guided in the circumferential direction by the crossover-wire guide blocks 50 represented by symbols c, b, and a (guide groove 55 (U)).

The crossover-wire portion 10b drawn out from the crossover-wire guide block 50 represented by symbol c passes through the insides of the crossover-wire guide blocks 50 (guide groove 55 (U)), which are represented by symbols b and a and are arranged in the circumferential direction toward the drawing position (terminal connection portion) of the terminal 70U in order. The crossover-wire portion 10b is guided in the circumferential direction by the crossover-wire guide blocks 50 represented by symbols b and a (guide groove 55 (U)).

The crossover-wire portion 10b drawn out from the crossover-wire guide block 50 represented by symbol b passes through the inside of the crossover-wire guide block 50 (guide groove 55 (U)), which is represented by symbol a and is arranged in the circumferential direction toward the drawing position (terminal connection portion) of the terminal 70U. The crossover-wire portion 10b is guided in the circumferential direction by the crossover-wire guide block 50 represented by symbol a (guide groove 55 (U)).

The crossover-wire portion 10b drawn out from the crossover-wire guide block 50 represented by symbol a is drawn to the drawing position (terminal connection portion) of the terminal 70U.

FIG. 20 shows a layout of the crossover-wire portion 10b of the V-phase line. FIG. 21 shows a layout of the crossover-wire portion 10b of the W-phase line. Regarding the V-phase line and the W-phase line, specific explanation is omitted. Similarly to the U-phase line, the crossover-wire portion 10b is drawn around in the V-phase line and the W-phase line.

According to the rotating electric machine 1 having the above-described configuration, when electric power is supplied to the coil 10 via the terminals 70U, 70V, and 70W, an interlinkage magnetic flux is generated around the stator 2. A magnetic suction force or a magnetic repulsion force is generated between the interlinkage magnetic flux and a magnet of the rotor 3, which is not shown in the drawings. As a result, the rotor 3 rotates in a predetermined direction. In addition, when the rotor 3 receives an external force and the rotating electric machine 1 rotates, a magnetic suction force or a magnetic repulsion force is generated between a magnet of the rotor 3, which is not shown in the drawings, and the coil 10 of the stator 2, and an interlinkage magnetic flux is generated. As a result, electric power is generated from the coil 10, and the electric power is output to the terminals 70U, 70V, and 70W.

In the above-mentioned embodiment, the guide groove 55 formed in the crossover-wire guide block 50 (crossover-wire guide portion) of the insulator 9 is formed in a shape that does not coincide with a circular arc of the virtual circle Ci having a center corresponding to the ring center c of the stator core 7. Accordingly, when the plurality of the winding blocks 51 are assembled in a ring shape, the plurality of the guide grooves 55 for the same phase are not formed in a continuously smooth circular shape, and a shape such that a plurality of small circular arcs are continuously connected in a ring shape is obtained. Therefore, when drawing the crossover-wire portion 10b of the coil 10 around the plurality of the guide grooves 55 for the same phase in the plurality of the winding blocks 51, the crossover-wire portion 10b comes into contact with inner surfaces of the plurality of the guide grooves 55 having small circular arcs, and the crossover-wire portion 10b is engaged with the plurality of the guide grooves 55 in a state in which displacement of the crossover-wire portion 10b is suppressed by the plurality of the guide grooves 55. Consequently, in a case of adopting the insulator 9 according to the embodiment to each of the plurality of the split cores 11, it is possible to suppress dropping-off of the crossover-wire portion 10b from the crossover-wire guide block 50 when assembling the stator 2.

Additionally, in the insulator 9 according to the embodiment, a rectangular wire is adopted as the coil 10. Therefore, when drawing the crossover-wire portion 10b of the coil 10 around the guide groove 55 of each insulator 9, a flat surface of the rectangular wire stably comes into contact with the inner surfaces of the guide walls 52A, 52B, 52C, and 52D. For this reason, it is possible to further reliably suppress displacement or dropping-off of the crossover-wire portion 10b from the guide groove 55.

Furthermore, in the insulator 9 according to the embodiment, the guide groove 55 formed in the crossover-wire guide block 50 (crossover-wire guide portion) has a center corresponding to the ring center c of the stator core 7, and is formed in a circular-arc shape having a radius of curvature smaller than that of a circular arc of the virtual circle Ci passing through both end portions 55e of the guide groove 55 in the core circumferential direction. Accordingly, since the guide groove 55 has a relatively-simple shape symmetric with respect to the circumferential direction, it is easy to manufacture the insulator 9.

Moreover, in the insulator 9 according to the embodiment, the plurality of the guide grooves 55 formed in the crossover-wire guide block 50 are provided to the respective coils for the phases different from each other. The plurality of the guide grooves 55 for the phases different from each other are arranged side by side in the core radial direction so as to form a plurality of steps. Consequently, while achieving a simple configuration, when assembling the crossover-wire portions 10b of the coils 10 for a plurality of phases into the guide grooves 55, it is possible to suppress displacement or dropping-off of the crossover-wire portions 10b from the crossover-wire guide block 50.

Furthermore, as another embodiment, a guide groove formed in a crossover-wire guide block (crossover-wire guide portion) may be formed in a circular-arc shape having a radius of curvature larger than that of the circular arc of the aforementioned virtual circle Ci. In this case, since the guide groove has a relatively-simple shape symmetric with respect to the circumferential direction, it is easy to manufacture the insulator.

According to at least one embodiment described above, the guide groove 55 of the insulator 9 is formed in a shape that does not coincide with a circular arc of the virtual circle Ci having a center corresponding to the ring center c of the stator core 7. Therefore, when the plurality of the winding blocks 51 are assembled in a ring shape, it is possible to suppress displacement of the crossover-wire portion 10b drawn around the guide groove 55 by the inner surface of the guide groove 55. Accordingly, it is possible to suppress dropping-off of the crossover-wire portion 10b from the crossover-wire guide block 50 when assembling the stator 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the inventions. The accompanying claims and their equivalents are intended to cover such forms or modifications as would fall within the scope of the inventions.

DESCRIPTION OF REFERENCE NUMERALS

1 . . . rotating electric machine, 2 . . . stator, 7 . . . stator core, 8 . . . teeth, 9 . . . insulator, . . . coil (rectangular wire), 10b . . . crossover-wire portion, 11 . . . split core, 35 . . . teeth cover portion, 50 . . . crossover-wire guide block (crossover-wire guide portion), 55 . . . guide groove

The invention claimed is:

1. An insulator to be attached to each of a plurality of split cores forming a ring-shaped stator core and including teeth extending to an inside in a core radial direction that is a radial direction of the stator core, the insulator comprising:
   a teeth cover portion that covers the teeth and has an outer-periphery around which a coil having a crossover-wire portion is wound; and
   a crossover-wire guide portion that is formed outside the teeth cover portion in the core radial direction, wherein
   the crossover-wire guide portion guides:
      the crossover-wire portion of the coil drawn out from the teeth cover portion; and
      an introduction crossover-wire portion of an introduction coil that is drawn out from a second split core different from a first split core attached to the teeth cover portion and is introduced into the crossover-wire guide portion,
      into a terminal connection portion disposed on a circumference substantially along a ring shape of the stator core,
   the crossover-wire guide portion has a guide groove that guides the crossover-wire portion and the introduction crossover-wire portion substantially in a core circumferential direction that is a circumferential direction of the stator core, and
   in a state in which the plurality of the split cores are assembled in a ring shape, the guide groove is formed in a shape that does not coincide with a circular arc of a circle having a center corresponding to a ring center of the assembled split cores, and wherein
   the guide groove has a center corresponding to a ring center of the assembled split cores, and is formed in a circular-arc shape having a radius of curvature larger than that of a circular arc of a virtual circle having an outer-periphery passing through both end portions of the guide groove in the core circumferential direction.

2. The insulator according to claim 1, wherein the coil is formed of a rectangular wire.

3. The insulator according to claim 1, wherein
the guide groove has a center corresponding to a ring center of the assembled split cores, and is formed in a circular-arc shape having a radius of curvature smaller than that of a circular arc of a virtual circle having an outer-periphery passing through both end portions of the guide groove in the core circumferential direction.

4. The insulator according to claim 1, wherein
the crossover-wire guide portion has a plurality of the guide grooves,
the plurality of the guide grooves are provided so as to correspond to coils for phases different from each other, and
the plurality of the guide grooves are arranged side by side in the core radial direction.

5. A stator, comprising:
the insulator according to claim 1; and
the plurality of the split cores to which the insulator is attached.

6. A rotating electric machine, comprising:
the stator according to claim 5; and
a rotor rotatably disposed with respect to the stator.

\* \* \* \* \*